US008443781B2

(12) United States Patent
Demura et al.

(10) Patent No.: US 8,443,781 B2
(45) Date of Patent: May 21, 2013

(54) CONTROL APPARATUS AND CONTROL METHOD FOR INTERNAL COMBUSTION ENGINE

(75) Inventors: Takayuki Demura, Mishima (JP); Kenji Shiotani, Kobe (JP)

(73) Assignees: Toyota Jidosha Kabushiki Kaisha, Toyota-shi (JP); Fujitsu Ten Limited, Kobe-Shi (JP)

( * ) Notice: Subject to any disclaimer, the term of this patent is extended or adjusted under 35 U.S.C. 154(b) by 967 days.

(21) Appl. No.: 12/470,019

(22) Filed: May 21, 2009

(65) Prior Publication Data

US 2009/0288646 A1 Nov. 26, 2009

(30) Foreign Application Priority Data

May 21, 2008 (JP) ................................ 2008-133447

(51) Int. Cl.
*G06F 7/00* (2006.01)

(52) U.S. Cl.
USPC ........... 123/326; 123/325; 123/520; 123/521; 701/104; 60/289

(58) Field of Classification Search
USPC .. 123/521, 325, 326, 431, 520, 674; 701/104, 701/109; 60/285, 289
See application file for complete search history.

(56) References Cited

U.S. PATENT DOCUMENTS

| | | | | |
|---|---|---|---|---|
| 5,022,225 | A * | 6/1991 | Sawada et al. | 60/274 |
| 5,228,286 | A * | 7/1993 | Demura | 60/276 |
| 5,284,050 | A * | 2/1994 | Iida et al. | 73/114.39 |
| 5,438,826 | A * | 8/1995 | Blischke et al. | 60/276 |
| 5,941,212 | A * | 8/1999 | Murakami et al. | 123/325 |
| 6,138,638 | A * | 10/2000 | Morikawa | 123/295 |
| 6,148,611 | A * | 11/2000 | Sato | 60/274 |
| 6,292,739 | B1 * | 9/2001 | Yasui et al. | 701/109 |
| 6,564,544 | B2 * | 5/2003 | Kakuyama et al. | 60/285 |
| 7,017,558 | B2 * | 3/2006 | Osanai | 123/520 |
| 7,059,120 | B2 * | 6/2006 | Nakagawa et al. | 60/289 |
| 7,150,265 | B2 * | 12/2006 | Shibagaki | 123/406.47 |
| 7,243,487 | B2 * | 7/2007 | Shouda et al. | 60/285 |

FOREIGN PATENT DOCUMENTS

| | | |
|---|---|---|
| JP | 5223021 | 8/1993 |
| JP | 7247889 | 9/1995 |
| JP | 2005016484 | 1/2005 |
| JP | 2005105834 | 4/2005 |
| JP | 2005171774 | 6/2005 |

* cited by examiner

*Primary Examiner* — Mahmoud Gimie
*Assistant Examiner* — David Hamaoui
(74) *Attorney, Agent, or Firm* — Gifford, Krass, Sprinkle, Anderson & Citkowski, P.C.

(57) ABSTRACT

An internal combustion engine control apparatus includes: a purge control unit causing fuel evaporative emission to be introduced into an intake passage to attain a purge flow rate based on a pressure in the intake passage; a fuel cut return rich control unit setting a rich target air-fuel ratio when returning from fuel cut, and feedback-controlling a fuel supply rate on the basis of the target air-fuel ratio, purge flow rate and intake air flow rate to attain the target air-fuel ratio; a fuel increase upper limit setting unit setting an allowable upper limit for an increase in fuel supply rate in fuel cut return rich control; and an actual air-fuel ratio control unit controlling an actual air-fuel ratio to a richer side when the fuel supply rate in the fuel cut return rich control has reached the allowable upper limit and the actual air-fuel ratio is lean.

7 Claims, 16 Drawing Sheets

CONTROL APPARATUS AND CONTROL METHOD FOR INTERNAL COMBUSTION ENGINE

INCORPORATION BY REFERENCE

The disclosure of Japanese Patent Application No. 2008-133447 filed on May 21, 2008 including the specification, drawings and abstract is incorporated herein by reference in its entirety.

BACKGROUND OF THE INVENTION

1. Field of the Invention

The invention relates to a control apparatus and control method for an internal combustion engine equipped with a purge device that introduces fuel evaporative emission into an intake passage and that controls an air-fuel ratio to a rich air-fuel ratio when returning from fuel cut.

2. Description of the Related Art

A fuel cut control is known as an existing technique. In the fuel cut control, when a predetermined requirement is satisfied, for example, supply of fuel to all combustion chambers of an internal combustion engine is interrupted in order to improve fuel economy. During fuel cut control of this type, only air flows through a catalyst carrier of an exhaust emission control device. Thus, there is a possibility that the air may accumulate in the catalyst carrier and, furthermore, the catalyst carrier temperature may decrease as compared with an active temperature. For this reason, when supply of fuel is resumed (that is, when returning from fuel cut), the purification performance of the exhaust emission control device for exhaust gas may possibly be decreased. Then, in an existing technique, in order to promptly consume air accumulated in the catalyst carrier and to quickly increase the catalyst carrier temperature to the active temperature when the catalyst carrier temperature is lower than the active temperature, the air-fuel ratio is controlled so that the actual air-fuel ratio temporarily attains a rich air-fuel ratio when returning from fuel cut (hereinafter, referred to as "fuel cut return rich control"). The above fuel cut return rich control is, for example, described in Japanese Patent Application Publication No. 2005-105834 (JP-A-2005-105834).

Incidentally, in a fuel tank, fuel evaporative emission (evaporation gas) is generated because of evaporation of stored fuel. Therefore, as the fuel evaporative emission increases, the internal pressure of the fuel tank increases. For this reason, an internal combustion engine generally includes a purge device that introduces (purges) fuel evaporative emission in the fuel tank into an intake passage to release the increased internal pressure. The purge device monitors a pressure in the intake passage, to which fuel evaporative emission is supplied, with a pressure sensor, and performs purge control such that fuel evaporative emission is introduced into the intake passage when the monitored pressure satisfies a predetermined requirement (for example, when the pressure in the intake passage attains a pressure corresponding to a predetermined intake negative pressure of the internal combustion engine).

Here, in a typical air-fuel ratio control of an internal combustion engine, the fuel supply rate from a fuel injector is adjusted in accordance with an intake air flow rate to achieve a target air-fuel ratio. For this reason, when the purge control is performed, the actual air-fuel ratio deviates to a rich side with respect to the target air-fuel ratio by the rate of introduced fuel evaporative emission (that is, purge flow rate). In addition, if the purge control is performed when no fuel evaporative emission is present in a path through which fuel evaporative emission is supplied, only air is supplied to the intake passage. Thus, the actual air-fuel ratio in this case deviates to a lean side with respect to the target air-fuel ratio. Therefore, in the existing technique, the purge flow rate is controlled so as to perform purge control while suppressing a large deviation between an actual air-fuel ratio and a target air-fuel ratio. For example, the purge flow rate is varied on the basis of a pressure in the intake passage.

However, when the value detected by the pressure sensor is abnormal, the actual purge flow rate increases or decreases with respect to a target purge flow rate at the time when the detected value is normal. Thus, the actual air-fuel ratio largely deviates to a rich side or a lean side with respect to the target air-fuel ratio. Then, particularly, if the actual air-fuel ratio during fuel cut return rich control becomes a lean air-fuel ratio, the amount of nitrogen oxides (NOx) generated in the combustion chambers increases. Moreover, it is difficult to promptly activate the exhaust emission control device, which is a main purpose of the fuel cut return rich control. This may lead to deterioration in emission performance due to poor purification of NOx in exhaust gas.

SUMMARY OF THE INVENTION

The invention provides a control apparatus and control method for an internal combustion engine, which is able to suppress deterioration in emission performance when returning from fuel cut.

According to a first aspect of the invention, a control apparatus for an internal combustion engine includes: a purge control unit that performs purge control to cause fuel evaporative emission to be introduced into an intake passage so as to attain a purge flow rate based on a pressure in the intake passage, to which the fuel evaporative emission is supplied; a fuel cut return rich control unit that performs fuel cut return rich control to set a target air-fuel ratio to a rich air-fuel ratio when returning from fuel cut and to control a fuel supply rate in a feedback manner on the basis of the target air-fuel ratio, the purge flow rate and an intake air flow rate so as to attain the target air-fuel ratio; a fuel increase upper limit setting unit that sets an allowable upper limit for an increase in fuel supply rate in the fuel cut return rich control; and an actual air-fuel ratio control unit that controls an actual air-fuel ratio to a richer air-fuel ratio when the fuel supply rate in the fuel cut return rich control has reached the allowable upper limit and when the actual air-fuel ratio is a lean air-fuel ratio.

In the first aspect, the actual air-fuel ratio control unit may include the fuel cut return rich control unit, and may prohibit the fuel cut return rich control and may perform normal air-fuel ratio feedback control.

With the above configuration, it is possible to increase the allowable upper limit when switched to normal air-fuel ratio feedback control, so it is allowed to increase the fuel supply rate. Thus, the control apparatus is able to control an actual air-fuel ratio to an appropriate target air-fuel ratio at which emission performance is excellent while avoiding a lean air-fuel ratio at which large amount of NOx is generated.

In the first aspect, the actual air-fuel ratio control unit may include the fuel increase upper limit setting unit, and may increase the allowable upper limit.

With the above configuration, it is possible to increase the fuel supply rate by increasing the allowable upper limit. Therefore, the control apparatus is able to control an actual air-fuel ratio to a target air-fuel ratio (rich air-fuel ratio), so the fuel cut return rich control unit is able to continue the fuel cut return rich control.

In the first aspect, the actual air-fuel ratio control unit may include the purge control unit, and may prohibit the purge control.

When the fuel supply rate in the fuel cut return rich control has reached the allowable upper limit and when the actual air-fuel ratio is a lean air-fuel ratio, that is, when the condition associated with deterioration in emission performance is satisfied during fuel cut return rich control, if almost no fuel evaporative emission is adsorbed in a canister, air may be introduced into the intake passage through the purge control. In this case, with the above configuration, the purge control is prohibited, so no air is introduced into the intake passage in accordance with the purge control. Therefore, the control apparatus is able to control an actual air-fuel ratio to a target air-fuel ratio (rich air-fuel ratio), so the fuel cut return rich control unit is able to continue the fuel cut return rich control.

In the first aspect, the actual air-fuel ratio control unit may include the purge control unit, and may decrease the purge flow rate as an actual air-fuel ratio becomes leaner or as a throttle opening degree increases.

With the above configuration, the purge flow rate is decreased as an actual air-fuel ratio becomes leaner or as a throttle opening degree increases, so the rate of air introduced into the intake passage in accordance with purge control decreases. Therefore, the control apparatus is able to control an actual air-fuel ratio to a target air-fuel ratio (rich air-fuel ratio), so the fuel cut return rich control unit is able to continue the fuel cut return rich control.

In the first aspect, the actual air-fuel ratio control unit may include the purge control unit, and may perform the purge control based on a throttle opening degree instead of the pressure in the intake passage.

When the fuel supply rate in the fuel cut return rich control has reached the allowable upper limit and when the actual air-fuel ratio is a lean air-fuel ratio, that is, when the condition associated with deterioration in emission performance is satisfied during fuel cut return rich control, corresponds to when a value detected by a pressure sensor that detects a pressure in the intake passage seems to have an abnormality and then information of an intake air flow rate that can be estimated from that detected value is not reliable. Therefore, with the above configuration, the throttle opening degree, from which information of an accurate intake air flow rate can be estimated, is used instead of the pressure in the intake passage, and the purge control based on the throttle opening degree is performed. Therefore, the control apparatus enables the purge control at a purge flow rate adapted to an actual intake air flow rate and is able to control an actual air-fuel ratio to a target air-fuel ratio (rich air-fuel ratio), so the fuel cut return rich control unit is able to continue the fuel cut return rich control.

The control apparatus for an internal combustion engine according to the first aspect performs control in the following manner when the condition associated with deterioration in emission performance is satisfied during fuel cut return rich control. In this case, for example, the control apparatus switches from fuel cut return rich control to normal air-fuel ratio feedback control, so it is possible to control an actual air-fuel ratio to an appropriate target air-fuel ratio at which emission performance is excellent, and it is possible to suppress deterioration in emission performance when returning from fuel cut. In addition, the control apparatus increases the fuel supply rate by increasing the allowable upper limit, prohibits the purge control, decreases the purge flow rate in accordance with a variation in actual air-fuel ratio to a lean side or an increase in throttle opening degree, or performs the purge control based on a throttle opening degree instead of a pressure in the intake passage to thereby continue the fuel cut return rich control. Therefore, at this time, it is possible to facilitate consumption of air in a catalyst carrier of an exhaust emission control device when returning from fuel cut, and, in addition, it is possible to increase the catalyst carrier temperature. Thus, it is possible to quickly activate the exhaust emission control device to suppress deterioration in emission performance when returning from fuel cut.

According to a second aspect of the invention, a control method for an internal combustion engine includes: performing purge control to cause fuel evaporative emission to be introduced into an intake passage so as to attain a purge flow rate based on a pressure in the intake passage, to which the fuel evaporative emission is supplied; performing fuel cut return rich control to set a target air-fuel ratio to a rich air-fuel ratio when returning from fuel cut and to control a fuel supply rate in a feedback manner on the basis of the target air-fuel ratio, the purge flow rate and an intake air flow rate so as to attain the target air-fuel ratio; setting an allowable upper limit for an increase in fuel supply rate in the fuel cut return rich control; and controlling an actual air-fuel ratio to a richer air-fuel ratio when the fuel supply rate in the fuel cut return rich control has reached the allowable upper limit and when the actual air-fuel ratio is a lean air-fuel ratio.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, control apparatuses for an internal combustion engine according to embodiments of the invention will be described in detail with reference to the accompanying drawings. Note that the embodiments are not intended to limit the scope of the invention.

First Embodiment

A control apparatus for an internal combustion engine according to a first embodiment of the invention will be described with reference to FIG. 1 to FIG. 5. Hereinafter, an example of an internal combustion engine to which the control apparatus is applied will be described while the control apparatus will be described in detail.

Figure 1:
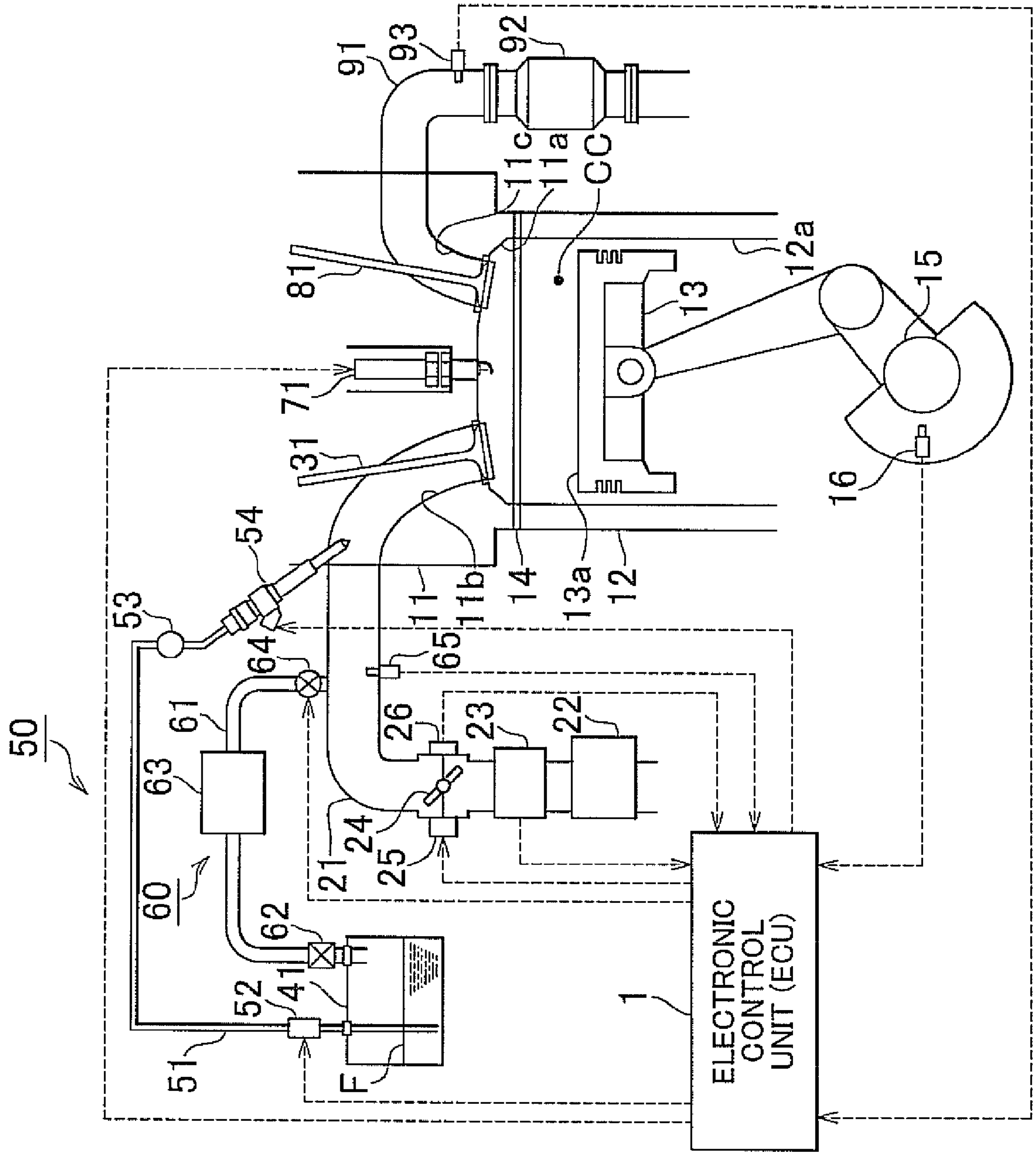
FIG. 1 is a view that shows an example of an internal combustion engine to which a control apparatus for an internal combustion engine according to an embodiment of the invention is applied.

The illustrated internal combustion engine is a vehicle drive source that, for example, uses gasoline as a fuel, and various control operations, such as combustion control, are performed by an electronic control unit (ECU) 1 shown in FIG. 1. That is, the control apparatus for an internal combustion engine is formed of the electronic control unit 1. Note that the electronic control unit 1 is formed of a central processing unit (CPU), a read only memory (ROM), a random access memory (RAM), a backup RAM, and the like, which are not shown in the drawing. The ROM prestores a predetermined control program, and the like. The RAM temporarily stores processing results of the CPU. The backup RAM stores prepared information, and the like.

First, the configuration of the internal combustion engine illustrated herein will be described with reference to FIG. 1. Note that FIG. 1 illustrates only one cylinder; however, the aspects of the invention are not limited to this configuration. The aspects of the invention may also be applied to a multi-cylinder multi-fuel internal combustion engine. In the first embodiment, description will be made on the condition that the internal combustion engine has a plurality of cylinders.

The internal combustion engine includes a cylinder head 11, a cylinder block 12 and pistons 13, which cooperate to form combustion chambers CC. Here, the cylinder head 11 and the cylinder block 12 are fastened to each other by bolts, or the like, via a head gasket 14 shown in FIG. 1, and the pistons 13 are reciprocally movably arranged in spaces formed of recesses 11*a* of the lower surface of the cylinder head 11 and cylinder bores 12*a* of the cylinder block 12. Then, each of the above described combustion chambers CC is formed of a space surrounded by the wall surface of each recess 11*a* of the cylinder head 11, the wall surface of a corresponding one of the cylinder bores 12*a* and a top surface 13*a* of a corresponding one of the pistons 13.

The internal combustion engine feeds air and fuel to the combustion chambers CC on the basis of operating conditions, such as an engine rotational speed and an engine load, and then performs combustion control in accordance with the operating conditions. The air is introduced from the outside through an intake passage 21 and intake ports 11*b* of the cylinder head 11, which are shown in FIG. 1. On the other hand, the fuel is supplied using a fuel supply device 50 shown in FIG. 1.

First, an air supply path will be described. An air cleaner 22 and an intake air flow rate detector 23 are provided in the intake passage 21 of the internal combustion engine. The air cleaner 22 removes foreign matter, such as dust, contained in air introduced from the outside. The intake air flow rate detector 23 detects an intake air flow rate at which air is taken in from the outside. The intake air flow rate detector 23 may be an air flow rate detecting sensor, such as an air flow meter, that directly detects an intake air flow rate, an intake pipe pressure sensor that detects a pressure in the intake passage 21 (that is, intake pressure), or the like. When the latter intake pipe pressure sensor is used, an intake air flow rate is indirectly obtained from the intake pressure and an engine rotational speed. In the internal combustion engine, a signal detected by the intake air flow rate detector 23 is transmitted to the electronic control unit 1, and the electronic control unit 1 calculates an intake air flow rate, an engine load, and the like, on the basis of the detected signal. Note that an engine rotational speed may be acquired from a signal detected by a crank angle sensor 16 that detects a rotation angle of a crankshaft 15.

In addition, a throttle valve 24 and a throttle valve actuator 25 are provided in the intake passage 21 at a portion downstream of the intake air flow rate detector 23. The throttle valve 24 is able to adjust the flow rate of air that flows into the combustion chambers CC. The throttle valve actuator 25 opens or closes the throttle valve 24. The electronic control unit 1 according to the first embodiment includes a throttle valve control unit. The throttle valve control unit drives the throttle valve actuator 25 on the basis of operating conditions of the internal combustion engine to adjust the opening degree of the throttle valve 24 so as to attain an opening degree based on the operating conditions. Here, the throttle valve actuator 25 and the throttle valve control unit constitute a throttle valve opening degree control unit. Furthermore, the internal combustion engine includes a throttle opening degree sensor 26. The throttle opening degree sensor 26 detects an opening degree of the throttle valve 24, and transmits the detected signal to the electronic control unit 1. Note that the throttle valve 24 is not necessarily actuated by the throttle valve actuator 25; instead, the throttle valve 24 may be actuated in response to an accelerator operation amount associated with driver's accelerator operation.

On the other hand, one end of each intake port 11*b* is open to a corresponding one of the combustion chambers CC, and an intake valve 31 is arranged at the opening to open or close the opening. The number of the openings that are open to each combustion chamber CC may be single or multiple, and the intake valve 31 is provided for each opening. Thus, in the internal combustion engine, the intake valves 31 are opened to introduce air from the intake ports 11*b* into the combustion chambers CC, while the intake valves 31 are closed to interrupt flow of air into the combustion chambers CC.

Here, each intake valve 31 is, for example, opened or closed in accordance with rotation of an intake camshaft (not shown) and snap force of an elastic member (coil spring). The intake valves 31 of this type are opened or closed at predetermined timings in such a manner that a power transmission mechanism formed of a chain, a sprocket, and the like, is intervened between the intake camshaft and the crankshaft 15 to interlock rotation of the intake camshaft with rotation of the crankshaft 15. The internal combustion engine illustrated herein may use the intake valves 31 that are opened or closed in synchronization with rotation of the crankshaft 15.

However, the internal combustion engine may include a variable valve mechanism, such as a so-called variable valve timing and lift mechanism that is able to change the open/close timing and lift amount of each intake valve 31. This makes it possible to suitably change the open/close timing and lift amount of each intake valve 31 on the basis of operating conditions of the internal combustion engine. Furthermore, the internal combustion engine may use a so-called electromagnetically driven valve that opens or closes each intake valve 31 using electromagnetic force in order to obtain a similar advantageous effect to that of the variable valve mechanism.

Next, the fuel supply device 50 will be described. The fuel supply device 50 may be the one that injects fuel F stored in a fuel tank 41 into each intake port 11*b*, the one that directly injects the fuel F into each combustion chamber CC, the one that injects the fuel F into each intake port 11*b* and each combustion chamber CC, or the like. The first embodiment typically illustrates a port injection type fuel supply device that injects fuel F stored in the fuel tank 41 into each intake port 11*b* and introduces the injected fuel F into each combustion chamber CC together with intake air.

Specifically, the fuel supply device 50 includes a feed pump 52, a fuel delivery pipe 53, and fuel injection valves (fuel injecting portions) 54. The feed pump 52 serves as a fuel pump that draws the fuel F from the fuel tank 41 and then feeds the fuel F into a fuel passage 51. The fuel delivery pipe 53 distributes the fuel F in the fuel passage 51 to the respective cylinders. The fuel injection valves 54 of the respective cylinders inject the fuel F supplied from the fuel delivery pipe 53 into the respective intake ports 11*b*.

The fuel supply device 50 allows a fuel injection control unit of the electronic control unit 1 to drive the feed pump 52 and the fuel injection valves 54 on the basis of operating conditions of the internal combustion engine. Thus, the fuel supply device 50 is configured to inject fuel F under fuel injection conditions of a target fuel injection rate, a fuel injection timing, a fuel injection period, and the like, in correspondence with the operating conditions. For example, the fuel injection control unit causes the feed pump 52 to draw the fuel F from the fuel tank 41, and causes the fuel injection valves 54 to inject the fuel F under the fuel injection conditions based on the operating conditions.

The fuel F supplied to the intake ports 11*b* in this way is supplied into the combustion chambers CC as the intake valves 31 open while being mixed with the above described air in the intake ports 11*b*. The target fuel injection rate of fuel F and the intake air flow rate of air, which are fed into the combustion chambers CC, are determined by an air-fuel ratio control unit of the electronic control unit 1 in accordance with a target air-fuel ratio based on the operating conditions. Here, it is assumed that the intake air flow rate is determined on the basis of the opening degree of the throttle valve 24 based on the accelerator operation amount, so the air-fuel ratio control unit regulates the target fuel injection rate to perform air-fuel ratio control, thus achieving the target air-fuel ratio.

Here, in the fuel tank 41, fuel evaporative emission (evaporation gas) is generated because of evaporation of fuel F stored therein. The fuel tank 41 is generally sealed, and the internal pressure of the fuel tank 41 increases as an increase in the fuel evaporative emission. Therefore, it is necessary to release the pressure to the outside. However, the fuel evaporative emission includes a hydrocarbon (HC) component if, for example, gasoline fuel is evaporated to form the fuel evaporative emission, so it should not be released to the atmosphere in terms of environmental performance. Then, the internal combustion engine includes a purge device 60. The purge device 60 introduces (purges) the fuel evaporative emission into the intake passage 21 and burns the fuel evaporative emission in the combustion chambers CC.

As shown in FIG. 1, the purge device 60 includes a fuel evaporative emission passage 61, a check valve 62, a canister 63, and a purge flow rate regulating unit 64. The fuel evaporative emission passage 61 provides fluid communication between the fuel tank 41 and the intake passage 21. The check valve 62 prevents backflow of fuel evaporative emission flowing from the fuel tank 41 into the fuel evaporative emission passage 61. The canister 63 adsorbs fuel evaporative emission that has passed through the check valve 62. Fuel evaporative emission is adsorbed by activated carbon in the canister 63. The purge flow rate regulating unit 64 regulates the rate of fuel evaporative emission introduced into the intake passage 21 (purge flow rate).

The check valve 62 is configured to open when the pressure in the fuel tank 41 is higher than or equal to a predetermined pressure and to close when the pressure is lower than the predetermined pressure. Because the check valve 62 opens when the pressure in the fuel tank 41 is higher than or equal to the predetermined pressure, fuel evaporative emission in the fuel tank 41 flows through the fuel evaporative emission passage 61 and is adsorbed by activated carbon in the canister 63. In addition, after that, when the pressure in the fuel tank 41 is lower than the predetermined pressure, the check valve 62 closes to interrupt the flow of fuel evaporative emission from the fuel tank 41 to the fuel evaporative emission passage 61.

In addition, the purge flow rate regulating unit 64 is an open/close valve that allows or interrupts fluid communication between the fuel evaporative emission passage 61 and the intake passage 21 (so-called purge vacuum switching valve (purge VSV)), and opens or closes in accordance with an instruction from a purge control unit of the electronic control unit 1. The purge flow rate regulating unit 64 changes the opening degree of a valve element steplessly or in a stepped manner to vary the purge flow rate.

The purge control unit controls a duty ratio for driving the purge flow rate regulating unit 64 (hereinafter, referred to as "VSV drive duty ratio") to vary the purge flow rate. The VSV drive duty ratio may be expressed by the following equation (1) using a target purge rate and a VSV full purge rate ratio.

$$\text{VSV drive duty ratio} = \text{Target purge rate}/\text{VSV full purge rate ratio} \quad (1)$$

As a rule, the target purge rate is decreased as the pressure in the intake passage 21 (that is, a pressure corresponding to a predetermined intake negative pressure of the internal combustion engine), to which is fuel evaporative emission is supplied, increases. Hereinafter, purge control, for which the target purge rate is set in accordance with the above rule, is termed "normal purge control". Thus, in the normal purge control, the purge flow rate decreases as the pressure in the intake passage 21 increases. The pressure in the intake passage 21 is detected by a pressure sensor 65 shown in FIG. 1.

In addition, the VSV full purge rate ratio is obtained from the following equation (2) using a VSV full flow rate ratio, a VSV single flow rate and an intake air flow rate.

$$\text{VSV full purge rate} = (\text{VSV full flow rate ratio} \times \text{VSV single flow rate})/\text{Intake air flow rate} \quad (2)$$

Figure 2:
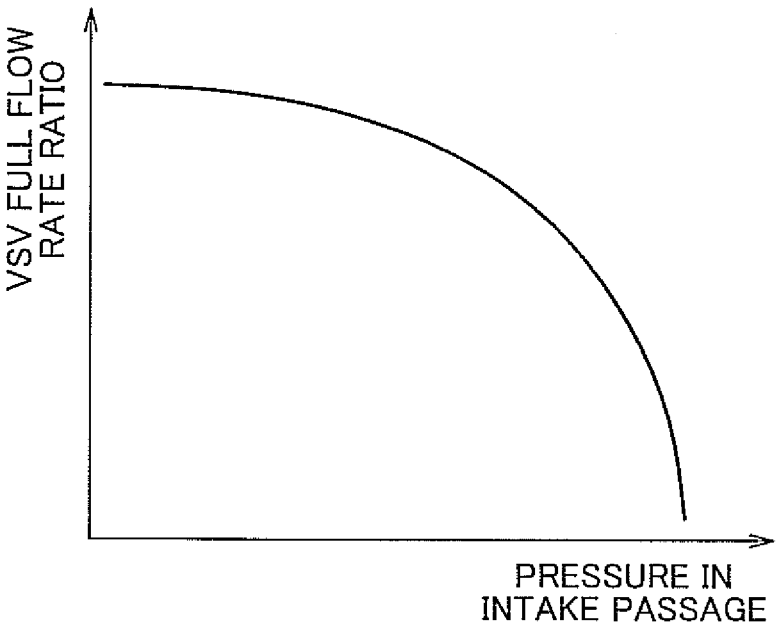
FIG. 2 is a graph that shows map data of a VSV full flow rate ratio versus a pressure in an intake passage.

The VSV full flow rate ratio indicates a ratio of a purge flow rate to an intake air flow rate when the valve element of the purge flow rate regulating unit 64 is fully opened, and varies as shown in FIG. 2 on the basis of the pressure in the intake passage 21. FIG. 2 is map data for obtaining a VSV full flow rate ratio during normal purge control. In the map data, the VSV full flow rate ratio decreases as the pressure in the intake passage 21 increases. In addition, the VSV single flow rate is a purge flow rate when the valve element of the purge flow rate regulating unit 64 is fully opened.

An air-fuel mixture in each combustion chamber CC through the above described air-fuel ratio control and purge control is caused to burn by ignition operation of a corresponding ignition plug 71 when it reaches an ignition timing based on operating conditions. Then, the burned in-cylinder gas (combustion gas) is discharged from each combustion chamber CC to an exhaust port 11*c* shown in FIG. 1 and is then released to the atmosphere via an exhaust passage 91.

An exhaust valve 81 is arranged at each exhaust port 11*c* to open or close an opening between the exhaust port 11*c* and the combustion chamber CC. The number of the openings that are open to each combustion chamber CC may be single or multiple, and the exhaust valve 81 is provided for each opening. Thus, in the internal combustion engine, the exhaust valves 81 are opened to discharge combustion gas from the combustion chambers CC into the exhaust ports 11*c*, while the exhaust valves 81 are closed to interrupt discharge of combustion gas to the exhaust ports 11*c*.

Here, the exhaust valves 81, as well as the above described intake valves 31, may be the one that is intervened by a power transmission mechanism, the one that has a variable valve mechanism, such as a so-called variable valve timing and lift mechanism, or a so-called electromagnetically driven valve.

Furthermore, an exhaust emission control device 92 is arranged in the exhaust passage 91, and purifies a harmful component in exhaust gas. In addition, an exhaust sensor 93 is arranged in the exhaust passage 91 at a portion upstream of the exhaust emission control device 92 (combustion chamber CC side). The exhaust sensor 93 is an A/F sensor that detects an actual air-fuel ratio from exhaust gas, and transmits the detected signal to the electronic control unit 1. In the first embodiment, the air-fuel ratio is controlled in a feedback manner on the basis of the value detected by the exhaust sensor 93. In the feedback control, the actual air-fuel ratio is determined on the basis of an intake air flow rate, a purge flow rate based on a target purge rate, and a fuel supply rate of the fuel injection valves 54. That is, while the feedback control is executed, the fuel supply rate of the fuel injection valves 54 is, for example, set on the basis of a target air-fuel ratio, a purge flow rate and an intake air flow rate.

Here, in the first embodiment, an allowable upper limit for an increase in fuel supply rate (hereinafter, referred to as "fuel increase upper limit guard value") is set, and the fuel supply rate of the fuel injection valves 54 is restricted so as not to increase beyond the fuel increase upper limit guard value. In addition, here, on the contrary to the fuel increase upper limit guard value, an allowable upper limit for a decrease in fuel supply rate (hereinafter, referred to as "fuel decrease upper limit guard value") is also set, and the fuel supply rate of the fuel injection valves 54 is restricted so as not to decrease beyond the fuel decrease upper limit guard value.

Incidentally, the electronic control unit 1 according to the first embodiment includes a fuel cut control unit and a fuel cut return rich control unit. The fuel cut control unit causes the internal combustion engine to perform the above described fuel cut control when a predetermined requirement is satisfied. The fuel cut return rich control unit causes the internal combustion engine to perform fuel cut return rich control (air-fuel ratio control that is performed so that the air-fuel ratio temporarily becomes a rich air-fuel ratio when returning from fuel cut) when returning from fuel cut. Thus, in the internal combustion engine according to the first embodiment, supply of fuel to all the combustion chambers CC is interrupted in accordance with fuel cut control, so, for example, fuel economy improves. Furthermore, in the internal combustion engine, exhaust gas also has a rich air-fuel ratio because of fuel cut return rich control, so air accumulated in the catalyst carrier of the exhaust emission control device 92 in accordance with fuel cut control is promptly consumed. In addition. Even when the catalyst carrier temperature is lower than the active temperature, it is possible to quickly increase the catalyst carrier temperature to the active temperature by high-temperature exhaust gas.

Even when the fuel cut return rich control is performed, the above described purge control may possibly be performed. In this case, the fuel cut return rich control unit controls the fuel supply rate of the fuel injection valves 54 to attain a set rich air-fuel ratio, and, in addition, the above described purge control unit controls the opening degree of the purge flow rate regulating unit 64 so as to attain a target purge rate (that is a VSV drive duty ratio) set on the basis of the value detected by the pressure sensor 65 (that is, the pressure in the intake passage 21).

In the fuel cut return rich control, in order to achieve its purpose, it is necessary to maintain the actual air-fuel ratio at a desired rich air-fuel ratio. Then, the fuel cut return rich control unit controls the actual air-fuel ratio to a desired rich air-fuel ratio in a feedback manner using the value detected by the exhaust sensor 93. The exhaust sensor 93 measures an oxygen concentration or an unburned fuel concentration in exhaust gas for estimating an actual air-fuel ratio. For this reason, in the fuel cut return rich control in which a rich air-fuel ratio is necessary, in consideration of the accuracy of estimation using the exhaust sensor 93, the fuel increase upper limit guard value and the fuel decrease upper limit guard value are smaller than those when normal air-fuel ratio feedback control is performed. That is, in the fuel cut return rich control, a variation in the amount of increase or the amount of decrease in fuel supply rate of the fuel injection valves 54 is smaller than that during normal air-fuel ratio feedback control. The normal air-fuel ratio feedback control is, for example, a feedback control performed by the air-fuel ratio control unit so that the air-fuel ratio, for example, attains a target air-fuel ratio set on the basis of operating conditions, such as an engine rotational speed. Here, the normal air-fuel ratio feedback control means air-fuel ratio control other than the fuel cut return rich control.

Here, during fuel cut return rich control, as the actual air-fuel ratio becomes a lean air-fuel ratio, the amount of generated NOx increases in accordance with combustion operation carried out in the combustion chambers CC, and, in addition, the fuel cut return rich control itself cannot be performed. Thus, it is difficult to quickly activate the exhaust emission control device 92. Thus, when returning from fuel cut, there is a possibility that the exhaust emission control device 92 may not sufficiently purify NOx contained in exhaust gas and, as a result, emission performance may be deteriorated.

For example, when the value detected by the pressure sensor 65 is abnormal during fuel cut return rich control, the purge flow rate may be larger than that when the detected value is normal. Then, when almost no fuel evaporative emission is adsorbed in the canister 63, there is a possibility that large amount of air may be introduced into the intake passage 21 and, as a result, the actual air-fuel ratio becomes a lean air-fuel ratio in spite of during fuel cut return rich control. Then, the fuel increase upper limit guard value is relatively small during fuel cut return rich control, so the fuel supply rate of the fuel injection valves 54 cannot be sufficiently increased because the fuel supply rate is restricted by the fuel increase upper limit guard value. Thus, there is a possibility that the actual air-fuel ratio may remain lean and may not be controlled to a target air-fuel ratio (rich air-fuel ratio). In addition, when the value detected by the pressure sensor 65 is abnormal during fuel cut return rich control, the purge flow rate may possibly be smaller than that when the detected value is normal. Then, fuel evaporative emission necessary to attain a target air-fuel ratio (rich air-fuel ratio) cannot be introduced into the intake passage 21, so the actual air-fuel ratio may become a lean air-fuel ratio. At this time, it is conceivable that the fuel supply rate of the fuel injection valves 54 is increased in order to set the actual air-fuel ratio to the target air-fuel ratio (rich air-fuel ratio). However, there is a possibility that the fuel supply rate cannot be appropriately increased because the fuel supply rate is restricted by the fuel increase upper limit guard value and, as a result, the actual air-fuel ratio remains lean.

Then, the control apparatus for an internal combustion engine according to the first embodiment is configured to be able to suppress deterioration in emission performance when the actual air-fuel ratio becomes a lean air-fuel ratio during fuel cut return rich control.

Specifically, in the first embodiment, when the condition associated with deterioration in emission performance is satisfied during fuel cut return rich control, the fuel cut return rich control is stopped and switched to normal air-fuel ratio feedback control.

Figure 3:
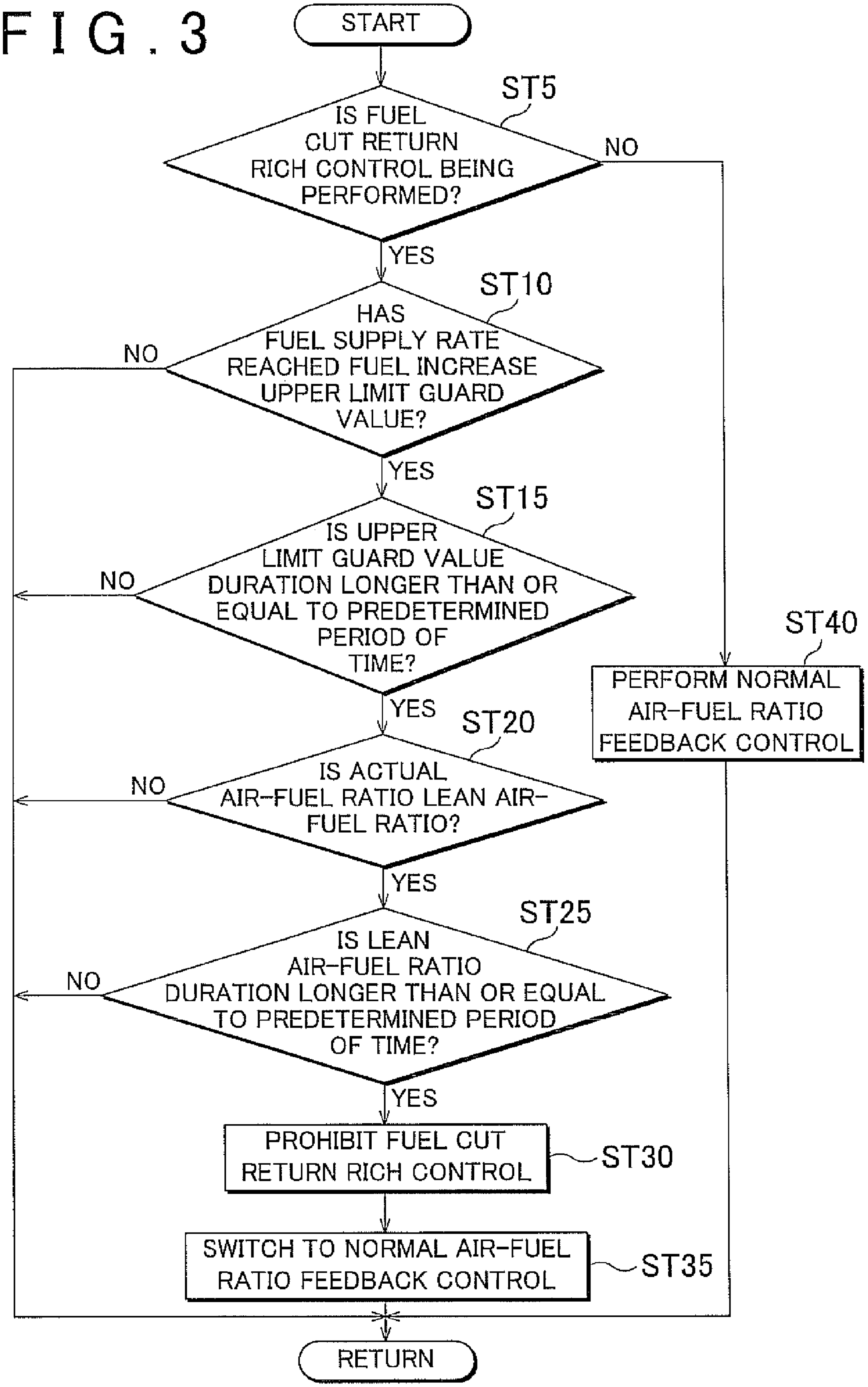
FIG. 3 is a flowchart that illustrates operations of the control apparatus for an internal combustion engine according to a first embodiment.

Hereinafter, operations of the control apparatus for an internal combustion engine according to the first embodiment based on whether fuel cut return rich control is being performed will be described with reference to the flowchart shown in FIG. 3.

First, the electronic control unit 1 determines whether fuel cut return rich control is being performed (step ST5). This determination may be made on the basis of whether the fuel cut return rich control unit of the electronic control unit 1 is performing fuel cut return rich control.

When it is determined in step ST5 that fuel cut return rich control is being performed, the electronic control unit 1 determines whether fuel cut return rich control is being performed using the fuel supply rate at the fuel increase upper limit guard value (that is, whether the fuel supply rate of the fuel injection valves 54 has reached the fuel increase upper limit guard value) (step ST10).

When it is determined in step ST10 that the fuel supply rate has not reached the fuel increase upper limit guard value, the electronic control unit 1 determines that the rich air-fuel ratio may be maintained to continue the fuel cut return rich control. Therefore, the electronic control unit 1 in this case returns to step ST5. When the fuel cut return rich control is continued by the fuel cut return rich control unit, determination in step ST10 is made again.

In addition, when it is determined in step ST10 that the fuel supply rate has reached the fuel increase upper limit guard value, the electronic control unit 1 determines that the value detected by the pressure sensor 65 may possibly be abnormal, and then determines whether the duration of fuel cut return rich control using the fuel increase upper limit guard value (hereinafter, referred to as "upper limit guard value duration") is longer than or equal to a predetermined period of time (step ST15).

Here, for example, when the value detected by the pressure sensor 65 has an error or when the detected value includes noise, the purge flow rate just momentarily increases or decreases. Therefore, the fuel supply rate of the above described fuel injection valves 54 may reach the fuel increase upper limit guard value with an increase in the fuel supply rate. Thus, in this case, it is not desirable to immediately determine that the value detected by the pressure sensor 65 is abnormal, so determination in step ST15 is made. The period of time may be, for example, a period of time during which it becomes apparent that the detected value is not influenced by a detection error or noise.

When it is determined in step ST15 that the upper limit guard value duration is shorter than the predetermined period of time, the electronic control unit 1 determines that it is highly likely that fuel cut return rich control is performed using the fuel supply rate corresponding to the fuel increase upper limit guard value because of the influence of the above detection error, or the like, and then returns to step ST5.

Figure 4:
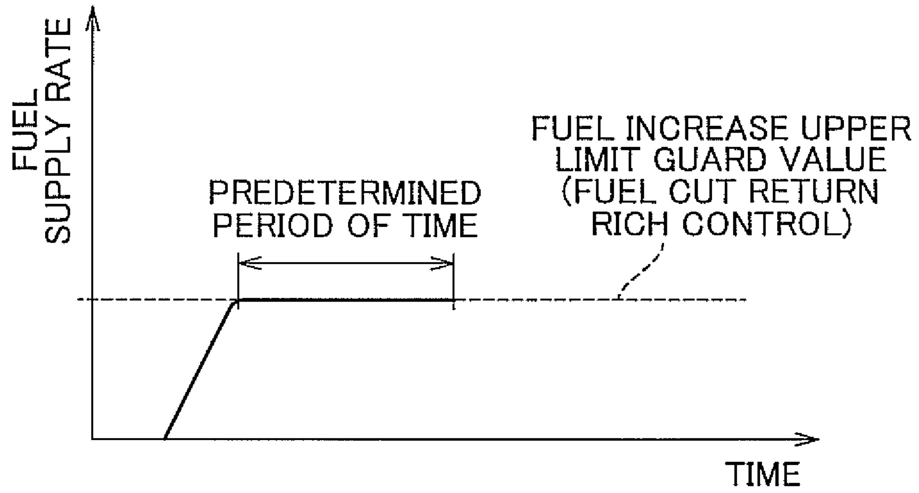
FIG. 4 is a graph that illustrates the relationship between a pre-change fuel increase upper limit guard value and a fuel supply rate.

In addition, when it is determined in step ST15 that the upper limit guard value duration is longer than or equal to the predetermined period of time as shown in FIG. 4, the electronic control unit 1 temporarily determines that the purge flow rate deviates by a large amount from the original target value because of abnormality of the value detected by the pressure sensor 65. Subsequently, the electronic control unit 1 obtains the actual air-fuel ratio on the basis of the value detected by the exhaust sensor 93 and then determines whether the actual air-fuel ratio is a lean air-fuel ratio (step ST20).

When it is determined in step ST20 that the actual air-fuel ratio is not a lean air-fuel ratio, the electronic control unit 1 determines that there is no abnormality in the value detected by the pressure sensor 65 or determines that it is possible to continue the fuel cut return rich control because the actual air-fuel ratio is a rich air-fuel ratio even when there is an abnormality. Thus, the electronic control unit 1 causes the fuel cut return rich control unit to continue the fuel cut return rich control, and returns to determination in step ST5. In this case, there is a case where the actual air-fuel ratio is a stoichiometric air-fuel ratio; however, operation at the stoichiometric air-fuel ratio does not lead to excessive deterioration in emission performance, and, in addition, the actual air-fuel ratio may possibly return to a rich air-fuel ratio depending on a purge flow rate. Therefore, even when the actual air-fuel ratio is a stoichiometric air-fuel ratio, the fuel cut return rich control is continued. Note that, alternatively, when it is determined that the actual air-fuel ratio is a stoichiometric air-fuel ratio, the fuel cut return rich control may be prohibited and may be switched to the normal air-fuel ratio feedback control.

On the other hand, even when it is determined in step ST20 that the actual air-fuel ratio is a lean air-fuel ratio, it is also conceivable that the state of the lean air fuel ratio is due to the influence of the above described detection error, or the like, of the pressure sensor 65. Therefore, here, when the state of the lean air-fuel ratio continues for a predetermined period of time, it is determined that the actual air-fuel ratio is truly a lean air-fuel ratio and, as a result, there is an abnormality in the value detected by the pressure sensor 65. Thus, in this case, the electronic control unit 1 determines whether the duration during which the actual air-fuel ratio is continuously a lean air-fuel ratio (hereinafter, referred to as "lean air-fuel ratio duration") is longer than or equal to a predetermined period of time (step ST25). The period of time may be, for example, a period of time during which it becomes apparent that the detected value is not influenced by the detection error, or the like.

For example, here, it is assumed that it is determined for the first time that the actual air-fuel ratio is a lean air-fuel ratio. In this case, it is determined in step ST25 that the lean air-fuel ratio duration is shorter than the predetermined period of time, so the process returns to step ST5.

In contrast, when it is determined in step ST25 that the lean air-fuel ratio duration is longer than or equal to the predetermined period of time, the fuel cut return rich control unit of the electronic control unit 1 issues an instruction for prohibiting fuel cut return rich control to stop the fuel cut return rich control (step ST30).

Here, the condition associated with deterioration in emission performance during fuel cut return rich control is when it is determined in step ST25 that the lean air-fuel ratio duration is longer than or equal to the predetermined period of time. Specifically, the condition associated with deterioration in emission performance is when, during fuel cut return rich control, the upper limit guard value duration is longer than or equal to the predetermined period of time and, in addition, the lean air-fuel ratio duration is also longer than or equal to the predetermined period of time. Then, when the above condition is satisfied, it is determined that there is an abnormality in the value detected by the pressure sensor 65.

In the first embodiment, after fuel cut return rich control is stopped, control performed by the fuel cut return rich control unit is switched to control performed by the air-fuel ratio control unit, and then the normal air-fuel ratio feedback control is performed (step ST35).

Figure 5:
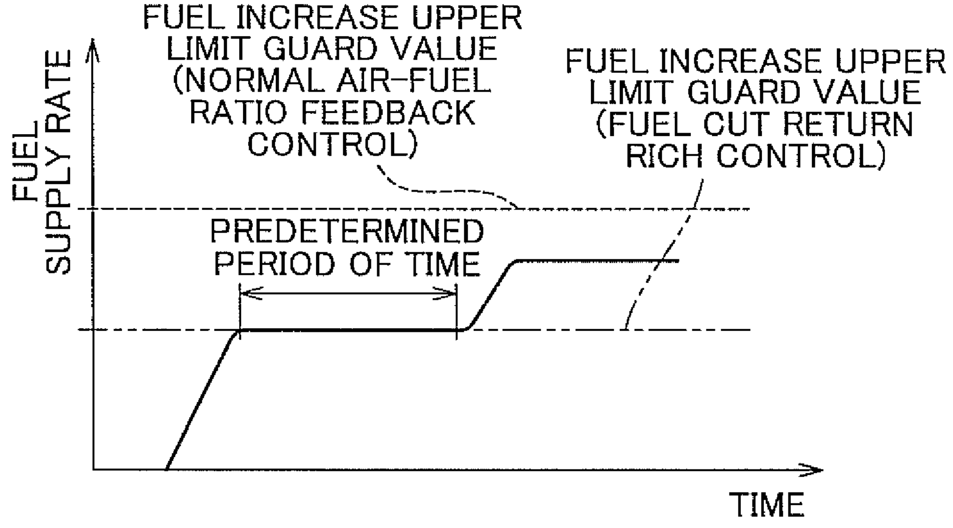
FIG. 5 is a graph that illustrates the relationship between a post-change fuel increase upper limit guard value and a fuel supply rate.

Thus, as shown in FIG. 5, a fuel increase upper limit setting unit sets the fuel increase upper limit guard value to a value in the normal air-fuel ratio feedback control (that is, a value that is larger for an increase in fuel supply rate than that during fuel cut return rich control). Therefore, the width of increase in fuel supply rate of the fuel injection valves 54 is wider than that during fuel cut return rich control, so, in the above case, it is possible to, for example, increase the fuel supply rate of the fuel injection valves 54 as shown in FIG. 5. Hence, the actual air-fuel ratio is appropriately controlled to a target air-fuel ratio through normal air-fuel ratio feedback control.

Here, when it is determined in step ST5 that the fuel cut return rich control is not being performed, the electronic control unit 1 causes the air-fuel ratio control unit to perform the normal air-fuel ratio feedback control (step ST40). Then, the electronic control unit 1 causes the purge control unit to perform the above described normal purge control.

In this way, the control apparatus for an internal combustion engine according to the first embodiment stops the fuel cut return rich control and switches to the normal air-fuel ratio feedback control when the condition associated with deterioration in emission performance is satisfied during fuel cut return rich control. Therefore, it is possible to increase the fuel supply rate because of an increase in fuel increase upper limit guard value. Thus, the air-fuel ratio control unit is able to control the actual air-fuel ratio to an appropriate target air-fuel ratio (for example, stoichiometric air-fuel ratio) at which emission performance is excellent while avoiding a lean air-fuel ratio at which large amount of NOx is generated. Accordingly, the control apparatus for an internal combustion engine according to the first embodiment is able to suppress deterioration in emission performance when returning from fuel cut.

Second Embodiment

Figure 6A:
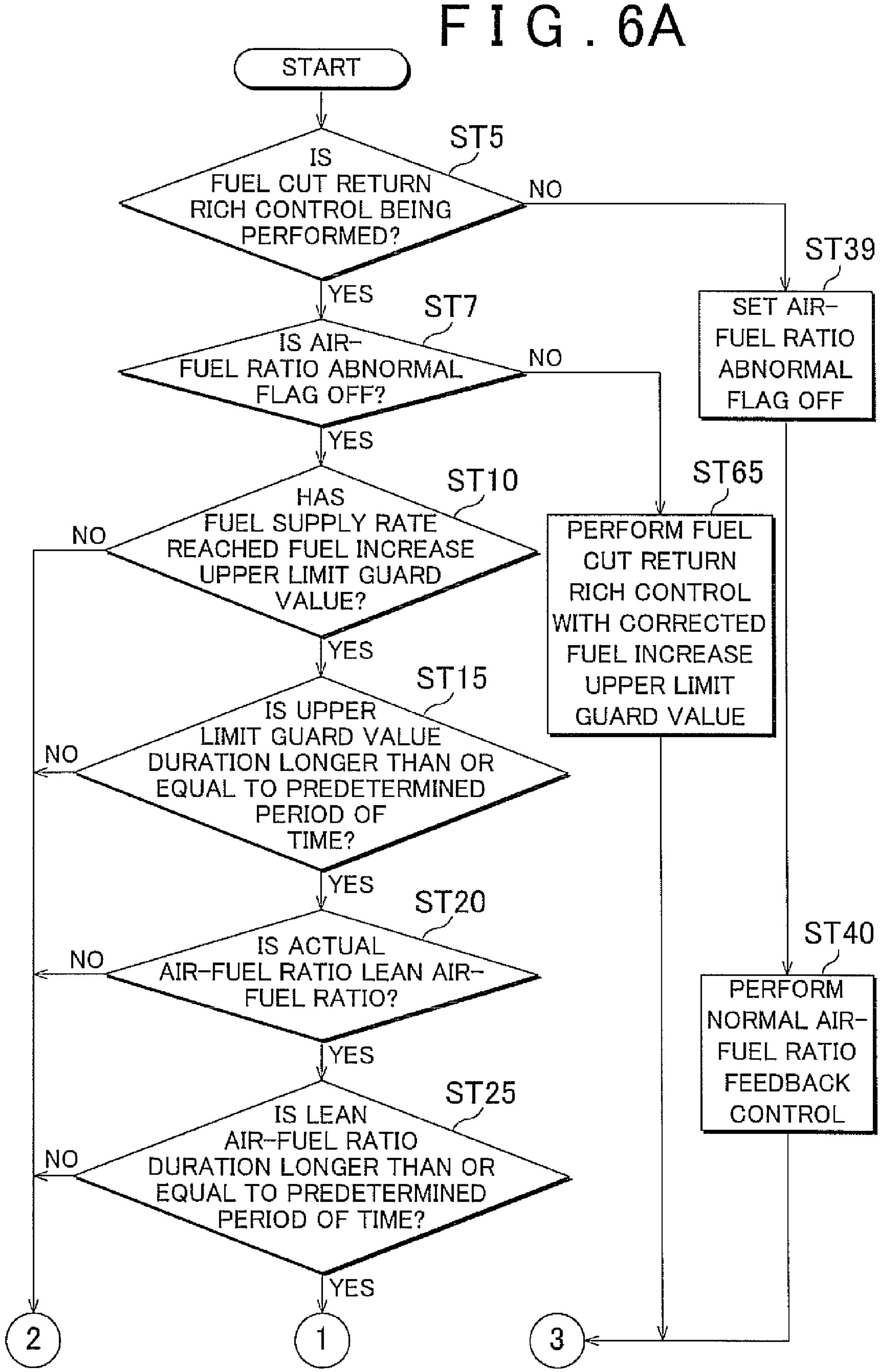
FIGS. 6A and 6B are a flowchart that illustrates operations of a control apparatus for an internal combustion engine according to a second embodiment.
Figure 6B:
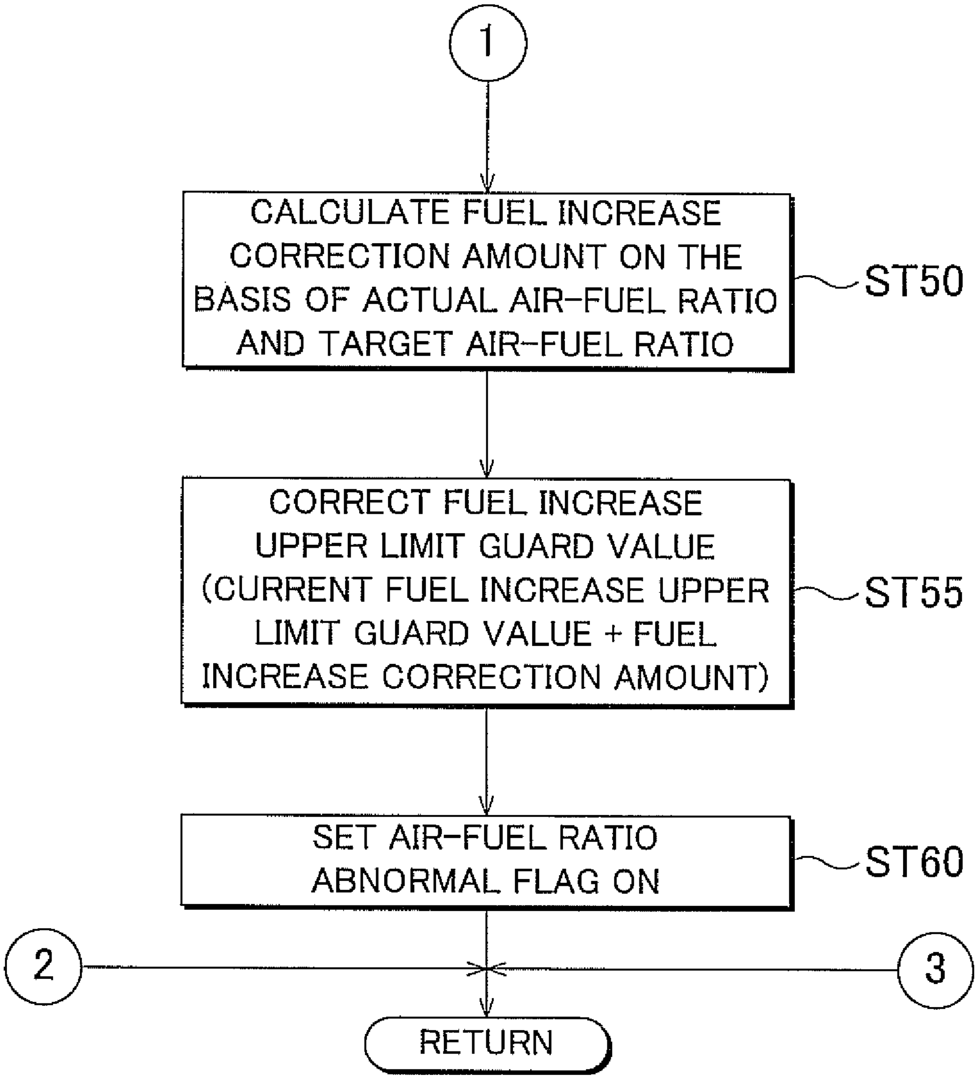

A control apparatus for an internal combustion engine according to a second embodiment of the invention will be described with reference to FIGS. 6 and 6B.

In the above described control apparatus for an internal combustion engine according to the first embodiment, when the condition associated with deterioration in emission performance is satisfied during fuel cut return rich control, the fuel cut return rich control is stopped and is switched to the normal air-fuel ratio feedback control. However, stop of the fuel cut return rich control advantageously suppresses deterioration in emission performance due to generation of large amount NOx when returning from fuel cut, whereas it inconveniently delays activation of the exhaust emission control device 92.

Then, in the control apparatus for an internal combustion engine according to the second embodiment, the control mode in the control apparatus for an internal combustion engine according to the first embodiment when the condition associated with deterioration in emission performance is satisfied during fuel cut return rich control is modified to make it possible to further effectively suppress deterioration in emission performance when returning from fuel cut. The second embodiment is also applied to the internal combustion engine shown in FIG. 1 and will be illustrated.

Specifically, the fuel increase upper limit setting unit of the electronic control unit 1 is configured so that the fuel increase upper limit guard value is increased (that is, the width of increase in fuel supply rate of the fuel injection valves 54 is widened) to control the lean actual air-fuel ratio to a rich air-fuel ratio so as to continue the fuel cut return rich control.

In the second embodiment, the fuel increase upper limit guard value is increased by a necessary minimum width of increase. Here, a fuel increase correction amount is calculated on the basis of a current actual air-fuel ratio and a target air-fuel ratio of the fuel cut return rich control, and then the width of increase in fuel supply rate of the fuel injection valves 54 is increased by the fuel increase correction amount. The fuel increase correction amount is calculated on the basis of the following equation (3).

$$\text{Fuel increase correction amount}=(\text{Actual air-fuel ratio}/\text{Target air-fuel ratio})-1 \quad (3)$$

Hereinafter, operations of the control apparatus for an internal combustion engine according to the second embodiment will be described with reference to the flowchart shown in FIGS. 6 and 6B.

First, as in the case of the first embodiment, the electronic control unit 1 determines whether fuel cut return rich control is being performed (step ST5).

Then, when it is determined in step ST5 that the fuel cut return rich control is being performed, the electronic control unit 1 according to the second embodiment determines whether an abnormal flag is set (whether an air-fuel ratio abnormal flag is off) (step ST7). The air-fuel ratio abnormal flag is set when a deviation occurs between an actual air-fuel ratio and a target air-fuel ratio because of an abnormality of the value detected by the pressure sensor 65, and is set when the actual air-fuel ratio is such a lean air-fuel ratio that emission performance is deteriorated during fuel cut return rich control.

When it is determined in step ST7 that the air-fuel ratio abnormal flag is off, the electronic control unit 1, as in the case of the first embodiment, determines whether the fuel supply rate of the fuel injection valves 54 has reached the fuel increase upper limit guard value (step ST10). The following determination in step ST15 to step ST25 is similar to the determination in step ST15 to ST25 according to the first embodiment, so the description thereof is omitted.

When it is determined in step ST25 that the lean air-fuel ratio duration is longer than or equal to the predetermined period of time, the fuel cut return rich control unit according to the second embodiment substitutes the actual air-fuel ratio calculated from the value detected by the exhaust sensor 93 and the target air-fuel ratio (rich air-fuel ratio) of the fuel cut return rich control into the above equation (3) to calculate the fuel increase correction amount (step ST50).

Then, the fuel increase upper limit setting unit of the electronic control unit 1 according to the second embodiment corrects the fuel increase upper limit guard value on the basis of the current fuel increase upper limit guard value and the fuel increase correction amount calculated in step ST50 (step ST55). Here, the fuel increase upper limit guard value is increased by the fuel increase correction amount from the current fuel increase upper limit guard value.

After the fuel increase upper limit guard value is corrected, the electronic control unit 1 sets the air-fuel ratio abnormal flag (air-fuel ratio abnormal flag is on) (step ST60), and then returns to step ST5.

After the electronic control unit 1 returns to step ST5, the electronic control unit 1 determines that the air-fuel ratio abnormal flag is set in step ST7 (air-fuel ratio abnormal flag is on), and performs fuel cut return rich control using the fuel increase upper limit guard value corrected in step ST55 (step ST65). That is, here, the width of increase in fuel supply rate of the fuel injection valves 54 is widened and, therefore, the fuel supply rate may be increased. Thus, it is possible to change the actual air-fuel ratio from a lean air-fuel ratio to a rich side. Thus, the fuel cut return rich control unit according to the second embodiment is able to control the actual air-fuel ratio to a target air-fuel ratio (rich air-fuel ratio), so it is possible to continue the fuel cut return rich control. The repeated operations of step ST5, step ST7 and step ST65 are carried out until it is determined in step ST5 that the fuel cut return rich control is not being performed.

Here, when it is determined in step ST5 that the fuel cut return rich control is not being performed, the electronic control unit 1 according to the second embodiment clears the air-fuel ratio abnormal flag (air-fuel ratio abnormal flag is off) (step ST39), and then causes the air-fuel ratio control unit to perform the normal air-fuel ratio feedback control (step ST40). Then, the electronic control unit 1 causes the purge control unit to perform the above described normal purge control.

In this way, when the condition associated with deterioration in emission performance is satisfied during fuel cut return rich control, the control apparatus for an internal combustion engine according to the second embodiment increases the fuel increase upper limit guard value for an increase in fuel supply rate to thereby widen the width of increase in fuel supply rate, thus allowing the fuel supply rate to increase. Therefore, as described above, even when the actual air-fuel ratio once becomes a lean air-fuel ratio, the fuel cut return rich control unit is able to control the actual air-fuel ratio to a target air-fuel ratio (rich air-fuel ratio) again. Thus, it is possible to continue the fuel cut return rich control. Accordingly, the control apparatus for an internal combustion engine according to the second embodiment is able to facilitate consumption of air in the catalyst carrier of the exhaust emission control device 92 when returning from fuel cut as compared with that of the first embodiment and, in addition, is able to increase the catalyst carrier temperature. Thus, it is possible to quickly activate the exhaust emission control device 92 to appropriately suppress deterioration in emission performance when returning from fuel cut.

Third Embodiment

Figure 7:
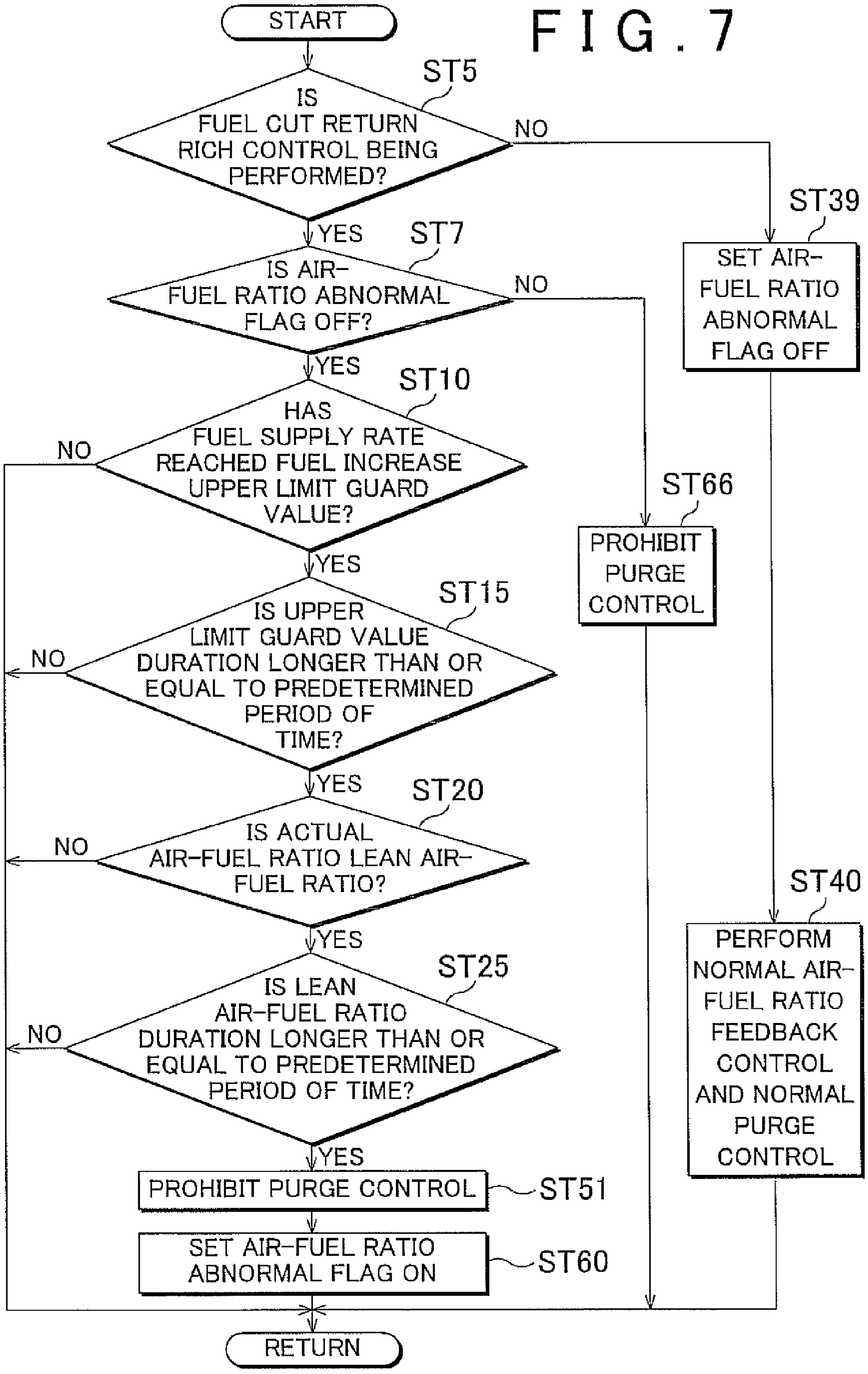
FIG. 7 is a flowchart that illustrates operations of a control apparatus for an internal combustion engine according to a third embodiment.

A control apparatus for an internal combustion engine according to a third embodiment of the invention will be described with reference to FIG. 7.

In order to obtain similar advantageous effects to those of the first and second embodiments, the control apparatus for an internal combustion engine according to the third embodiment modifies the control mode in the control apparatus for an internal combustion engine according to the above first embodiment or second embodiment when the condition associated with deterioration in emission performance is satisfied during fuel cut return rich control. Specifically, when the above condition is satisfied, there is a possibility that air is mainly introduced into the intake passage 21 in accordance with purge control as described in the first embodiment. Thus, in the third embodiment, purge control in this case is stopped to suppress a variation in air-fuel ratio to a lean side. Note that the third embodiment is also applied to the internal combustion engine shown in FIG. 1 and will be illustrated.

Hereinafter, operations of the control apparatus for an internal combustion engine according to the third embodiment will be described with reference to the flowchart shown in FIG. 7. Note that the determination in step ST5 to ST25 is similar to the determination in step ST5 to ST25 described in the second embodiment, so the description thereof is omitted. In addition, operations when negative determination is made in step ST5 are also similar to those described in the second embodiment, so the description thereof is omitted.

When it is determined in step ST25 that the lean air-fuel ratio duration is longer than or equal to the predetermined period of time, the electronic control unit 1 according to the third embodiment causes the purge control unit to prohibit the purge control (step ST51).

Here, when the above determination is made, it is desirable that the electronic control unit 1 determines whether fuel evaporative emission is adsorbed in the canister 63, and, as a result, when it is determined that air or mostly air is introduced into the intake passage 21 because of the purge control, the electronic control unit 1 causes the purge control unit to prohibit the purge control. By so doing, here, it is possible to stop introducing air into the intake passage 21 in accordance with the purge control. The state of the canister 63 may be determined by, for example, totally taking into consideration the duration during which the check valve 62 is opened, the capacity of the canister 63 and the duration during which the purge control is performed.

Then, the electronic control unit 1 sets the air-fuel ratio abnormal flag (air-fuel ratio abnormal flag is on) (step ST60), and then returns to step ST5. After the electronic control unit 1 returns to step ST5, the electronic control unit 1 determines that the air-fuel ratio abnormal flag is set in step ST7 (air-fuel ratio abnormal flag is on) during fuel cut return rich control, and causes the purge control unit to prohibit the purge control (step ST66).

In this way, in the third embodiment, the purge control is stopped to stop introducing air into the intake passage 21 in accordance with the purge control, so the actual air-fuel ratio is varied to a rich side as compared with that before the purge control is prohibited. Then, the fuel cut return rich control unit according to the third embodiment is able to increase the fuel supply rate of the fuel injection valves 54 at least by an amount of decrease in purge flow rate if the actual air-fuel ratio is not richer than a target air-fuel ratio. Therefore, here, it is possible to change the lean actual air-fuel ratio to a rich air-fuel ratio, and it is possible to bring the actual air-fuel ratio close to a target air-fuel ratio.

As described above, the control apparatus for an internal combustion engine according to the third embodiment prohibits the purge control so as not to introduce air into the intake passage 21 in accordance with purge control when the condition associated with deterioration in emission performance is satisfied during fuel cut return rich control. Therefore, as described above, even when the actual air-fuel ratio once becomes a lean air-fuel ratio, the fuel cut return rich control unit is able to bring the actual air-fuel ratio close to a target air-fuel ratio (rich air-fuel ratio) again. Thus, it is possible to continue the fuel cut return rich control. Accordingly, the control apparatus for an internal combustion engine according to the third embodiment is able to facilitate consumption of air in the catalyst carrier of the exhaust emission control device 92 when returning from fuel cut and, in addition, is able to increase the catalyst carrier temperature. Thus, it is possible to quickly activate the exhaust emission control device 92 to appropriately suppress deterioration in emission performance when returning from fuel cut.

Fourth Embodiment

Figure 8:
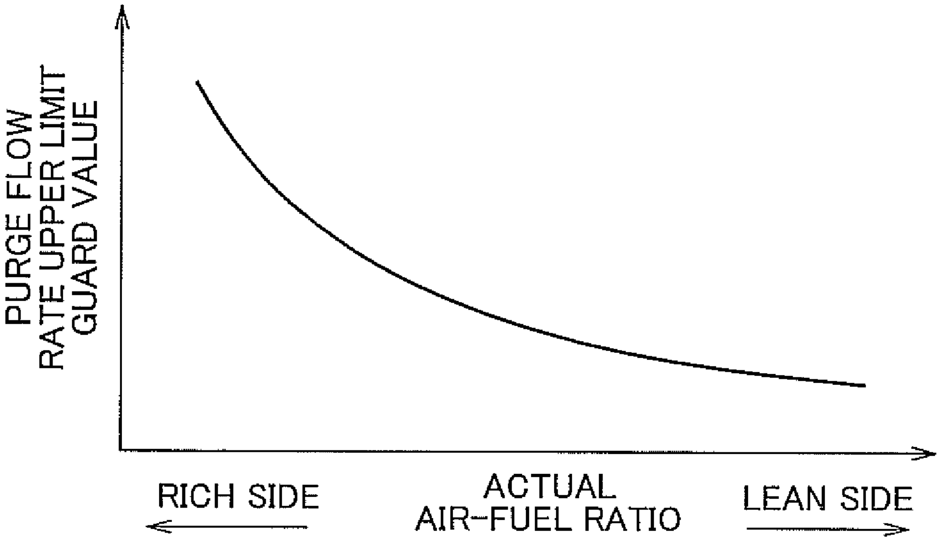
FIG. 8 is a graph that shows map data of a purge flow rate upper limit guard value versus an actual air-fuel ratio.
Figure 9A:
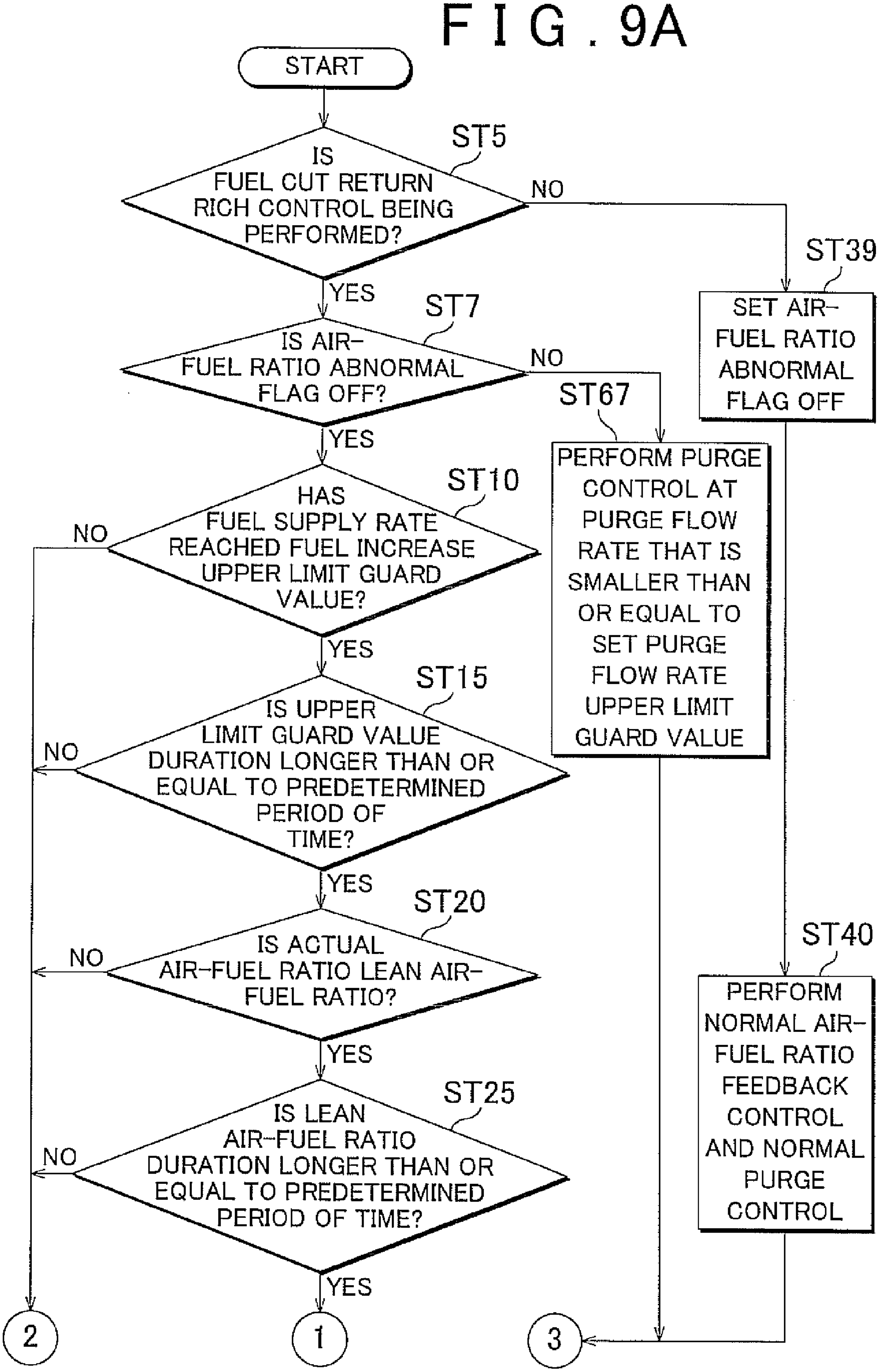
FIGS. 9A and 9B are a flowchart that illustrates operations of a control apparatus for an internal combustion engine according to a fourth embodiment.
Figure 9B:
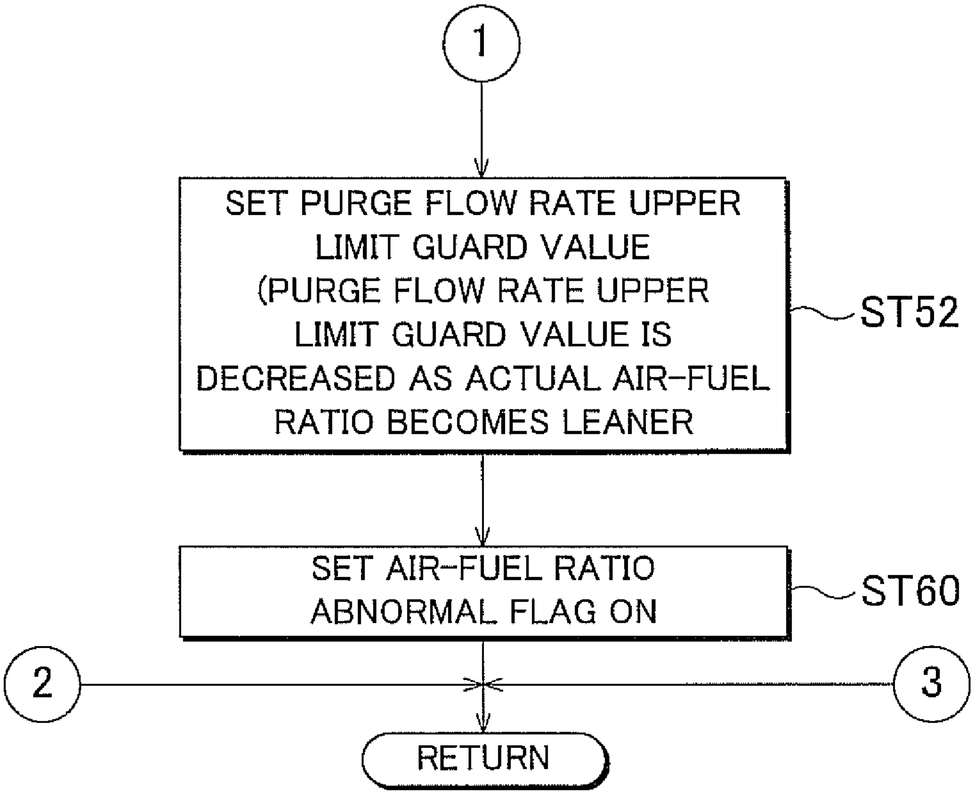

A control apparatus for an internal combustion engine according to a fourth embodiment of the invention will be described with reference to FIG. 8, FIGS. 9A and 9B.

In the above described control apparatus for an internal combustion engine according to the third embodiment, when the condition associated with deterioration in emission performance is satisfied during fuel cut return rich control, the purge control is prohibited to return the actual air-fuel ratio from a lean air-fuel ratio to a rich air-fuel ratio again so as to continue the fuel cut return rich control. However, for example, when the lean degree of the actual air-fuel ratio is relatively small with respect to the stoichiometric air-fuel ratio, there is a possibility that the actual air-fuel ratio may be richer than a target air-fuel ratio (rich air-fuel ratio) of the fuel cut return rich control when the purge control is prohibited. In addition, when the actual air-fuel ratio after the purge control is prohibited is leaner than the target air-fuel ratio of the fuel cut return rich control, it is necessary to increase the fuel supply rate of the fuel injection valves 54. However, even when the fuel supply rate is attempted to increase, there is a possibility that the increase in fuel supply rate may be restricted by the fuel increase upper limit guard value and, as a result, the actual air-fuel ratio cannot reach the target air-fuel ratio.

Then, in the control apparatus for an internal combustion engine according to the fourth embodiment, the control apparatus for an internal combustion engine according to the third embodiment is modified so that the actual air-fuel ratio attains the target air-fuel ratio during fuel cut return rich control to appropriately suppress deterioration in emission performance when returning from fuel cut. The fourth embodiment is also applied to the internal combustion engine shown in FIG. 1 and will be illustrated.

Specifically, the purge control unit is configured to set the upper limit of the purge flow rate on the basis of the actual air-fuel ratio. The above configuration is implemented in such a manner that the upper limit of the purge flow rate (hereinafter, referred to as "purge flow rate upper limit guard value") based on the actual air-fuel ratio is set and then the actual purge flow rate is controlled so as not to exceed the purge flow rate upper limit guard value. The purge flow rate upper limit guard value is decreased as the actual air-fuel ratio becomes leaner as shown in FIG. 8. That is, in the fourth embodiment, as the actual air-fuel ratio becomes leaner, the purge flow rate is decreased. The correspondence relationship between the purge flow rate upper limit guard value and the actual air-fuel ratio is set on the basis of the results of experiments or simulations carried out under the condition that the actual air-fuel ratio is controlled to or brought close to a target air-fuel ratio of the fuel cut return rich control.

Hereinafter, operations of the control apparatus for an internal combustion engine according to the fourth embodiment will be described with reference to the flowchart shown in FIGS. 9 and 9B. Note that the determination in step ST5 to ST25 is similar to the determination in step ST5 to ST25 described in the third embodiment, so the description thereof is omitted. In addition, operations when negative determination is made in step ST5 are also similar to those described in the third embodiment, so the description thereof is omitted.

When it is determined in step ST25 that the lean air-fuel ratio duration is longer than or equal to the predetermined period of time, the electronic control unit 1 according to the fourth embodiment causes the purge control unit to set the purge flow rate upper limit guard value based on the actual air-fuel ratio (step ST52). Here, as described above, the purge flow rate upper limit guard value is decreased as the actual air-fuel ratio becomes leaner, and the purge flow rate decreases as the actual air-fuel ratio becomes leaner.

In the fourth embodiment as well, after the above determination is made, it is desirable that the electronic control unit 1 determines whether fuel evaporative emission is adsorbed in the canister 63, and, as a result, when it is determined that air or mostly air is introduced into the intake passage 21 because of the purge control, the electronic control unit 1 performs step ST52.

The electronic control unit 1 subsequently sets the air-fuel ratio abnormal flag (air-fuel ratio abnormal flag is on) (step ST60) and then returns to step ST5. After the electronic control unit 1 returns to step ST5, the electronic control unit 1 determines that the air-fuel ratio abnormal flag is set in step ST7 (air-fuel ratio abnormal flag is on) during fuel cut return rich control, and causes the purge control unit to perform the purge control so that the purge flow rate upper limit guard value set in step ST52 is used as the upper limit of the purge flow rate (step ST67).

Here, the actual air-fuel ratio is a lean air-fuel ratio when the affirmative determination is made in step ST25, so the purge control is performed with a relatively small purge flow rate upper limit guard value. Therefore, here, the actual purge flow rate is smaller than the purge flow rate before the purge flow rate upper limit guard value is set (purge flow rate corresponding to a target purge rate), and the rate of air introduced into the intake passage 21 decreases. Thus, the fuel cut return rich control unit is able to return the lean actual air-fuel ratio to a rich air-fuel ratio.

In addition, in step ST67, it is desirable that, in consideration of the amount of deviation between the actual air-fuel ratio and the target air-fuel ratio of the fuel cut return rich control, the electronic control unit 1 causes the purge control unit to set the purge flow rate of which the upper limit is the purge flow rate upper limit guard value. Thus, in this case, the actual air-fuel ratio is definitely controlled to the target air-fuel ratio of the fuel cut return rich control.

Here, as described in the first embodiment, the purge flow rate is regulated by controlling the VSV drive duty ratio of the purge flow rate regulating unit (purge VSV) 64. Thus, in the fourth embodiment, the purge control unit may be configured so that the upper limit of the VSV drive duty ratio is limited on the basis of the actual air-fuel ratio to achieve an appropriate purge flow rate based on the actual air-fuel ratio. In this case, the upper limit of the VSV drive duty ratio (hereinafter, referred to as "VSV drive duty ratio upper limit guard value") based on the actual air-fuel ratio is set, and the VSV drive duty ratio of the purge flow rate regulating unit 64 is controlled so as not to exceed the VSV drive duty ratio upper limit guard value. The VSV drive duty ratio upper limit guard value, as well as the purge flow rate upper limit guard value, decreases as the actual air-fuel ratio becomes leaner.

When this case will be described using the flowchart shown in FIGS. 9 and 9B, in step ST52, the VSV drive duty ratio upper limit guard value is decreased as the actual air-fuel ratio becomes leaner. Then, in step ST67, the purge flow rate regulating unit 64 is controlled at the VSV drive duty ratio such that the VSV drive duty ratio upper limit guard value is set as the upper limit. Thus, in this case, the actual purge flow rate is smaller than the purge flow rate based on the target purge rate, and the rate of air introduced into the intake passage 21 decreases. Thus, the fuel cut return rich control unit is able to return the actual air-fuel ratio from a lean air-fuel ratio to a rich air-fuel ratio.

Furthermore, in step ST67, it is desirable that, in consideration of the amount of deviation between the actual air-fuel ratio and the target air-fuel ratio of the fuel cut return rich control, the electronic control unit 1 causes the purge control unit to set the VSV drive duty ratio of which the upper limit is the VSV drive duty ratio upper limit guard value. Thus, in this case, the actual air-fuel ratio is definitely controlled to the target air-fuel ratio of the fuel cut return rich control.

As described above, the control apparatus for an internal combustion engine according to the fourth embodiment decreases the purge flow rate as the actual air-fuel ratio becomes leaner to decrease the rate of air introduced into the intake passage 21 in accordance with the purge control when the condition associated with deterioration in emission performance is satisfied during fuel cut return rich control. Therefore, as described above, even when the actual air-fuel ratio once becomes a lean air-fuel ratio, the fuel cut return rich control unit is able to bring the actual air-fuel ratio close to a target air-fuel ratio (rich air-fuel ratio) again. Thus, it is possible to continue the fuel cut return rich control. In addition, by setting the purge flow rate on the basis of the amount of deviation between the actual air-fuel ratio and the target air-fuel ratio of the fuel cut return rich control, the fuel cut return rich control unit is able to control the actual air-fuel ratio to the target air-fuel ratio. Accordingly, the control apparatus for an internal combustion engine according to the fourth embodiment is able to facilitate consumption of air in the catalyst carrier of the exhaust emission control device 92 when returning from fuel cut and, in addition, is able to increase the catalyst carrier temperature. Thus, it is possible to quickly activate the exhaust emission control device 92 to further appropriately suppress deterioration in emission performance when returning from fuel cut as compared with the third embodiment.

Fifth Embodiment

Figure 10:
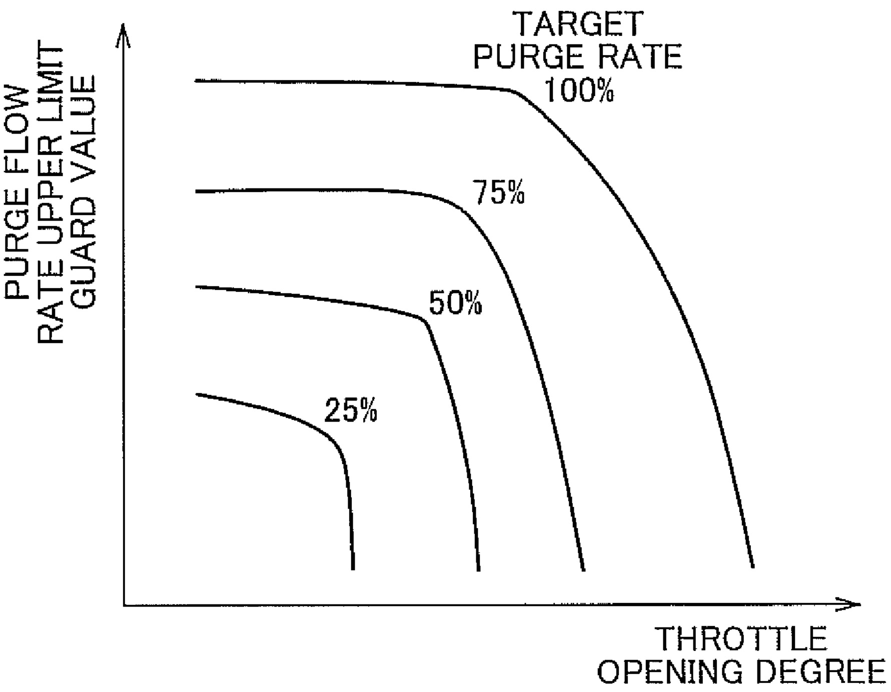
FIG. 10 is a graph that shows map data of a purge flow rate upper limit guard value versus a throttle opening degree and a target purge rate.
Figure 11A:
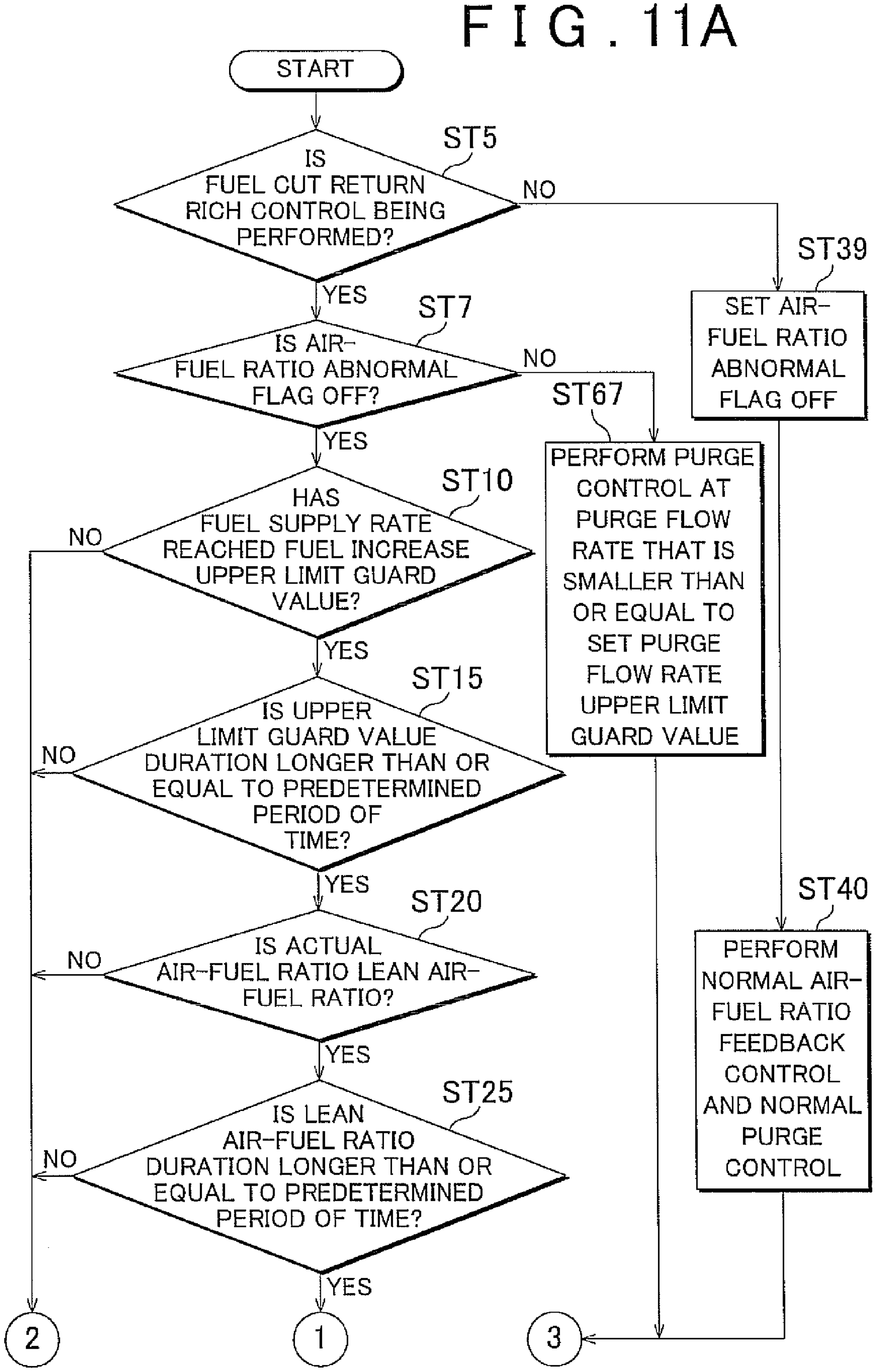
FIGS. 11A and 11B are a flowchart that illustrates operations of a control apparatus for an internal combustion engine according to a fifth embodiment.
Figure 11B:
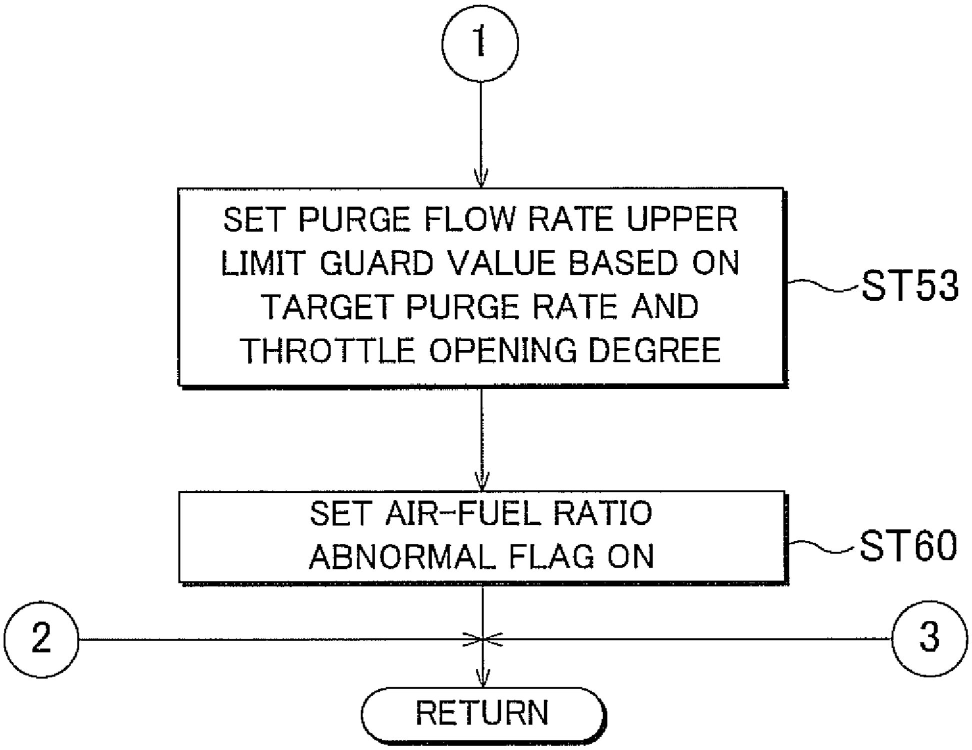

A control apparatus for an internal combustion engine according to a fifth embodiment of the invention will be described with reference to FIG. 10, FIGS. 11A and 11B.

In the control apparatus for an internal combustion engine according to the fifth embodiment, the setting condition of the purge flow rate upper limit guard value is changed in the control apparatus for an internal combustion engine according to the above fourth embodiment when the condition associated with deterioration in emission performance is satisfied during fuel cut return rich control. Specifically, in the fourth embodiment, the purge flow rate upper limit guard value is set on the basis of the actual air-fuel ratio. On the other hand, in the fifth embodiment, as shown in FIG. 10, the purge flow rate upper limit guard value is set on the basis of the target purge rate and the throttle opening degree detected by the throttle opening degree sensor 26. The correspondence relationship among a purge flow rate upper limit guard value, a target purge rate and a throttle opening degree is set on the basis of the results of experiments or simulations carried out under the condition that the actual air-fuel ratio is controlled to or brought close to a target air-fuel ratio of the fuel cut return rich control. Note that the purge flow rate upper limit guard value is decreased because, as a rule, the intake air flow rate increases as the throttle opening degree increases; however, the purge flow rate upper limit guard value may possibly increase depending on the relationship with the target purge rate. The fifth embodiment is also applied to the internal combustion engine shown in FIG. 1 and will be illustrated.

Hereinafter, operations of the control apparatus for an internal combustion engine according to the fifth embodiment will be described with reference to the flowchart shown in FIGS. 11A and 11B. Note that the determination in step ST5 to ST25 is similar to the determination in step ST5 to ST25 described in the third and fourth embodiments, so the description thereof is omitted. In addition, operations when negative determination is made in step ST5 are also similar to those described in the third and fourth embodiments, so the description thereof is omitted.

When it is determined in step ST25 that the lean air-fuel ratio duration is longer than or equal to the predetermined period of time, the electronic control unit 1 according to the fifth embodiment causes the purge control unit to set the purge flow rate upper limit guard value based on the target purge rate and the throttle opening degree (step ST53).

In the fifth embodiment as well, after the above determination is made, it is desirable that the electronic control unit 1 determines whether fuel evaporative emission is adsorbed in the canister 63, and, as a result, when it is determined that air or mostly air is introduced into the intake passage 21 because of the purge control, the electronic control unit 1 performs step ST53.

The electronic control unit 1 subsequently sets the air-fuel ratio abnormal flag (air-fuel ratio abnormal flag is on) (step ST60) and then returns to step ST5. After the electronic control unit 1 returns to step ST5, the electronic control unit 1 determines that the air-fuel ratio abnormal flag is set in step ST7 (air-fuel ratio abnormal flag is on) during fuel cut return rich control, and causes the purge control unit to perform the purge control so that the purge flow rate upper limit guard value set in step ST53 is used as the upper limit of the purge flow rate (step ST67).

Here, the actual air-fuel ratio is a lean air-fuel ratio when the affirmative determination is made in step ST25, so the purge control is performed with the purge flow rate upper limit guard value that is decreased as the throttle opening degree increases. Therefore, here, the actual purge flow rate may be decreased by a larger amount than the purge flow rate before the purge flow rate upper limit guard value is set (purge flow rate corresponding to a target purge rate) as the throttle opening degree increases and the intake air flow rate increases. Hence, in this case, the rate of air introduced into the intake passage 21 may be decreased by a large amount, so the fuel cut return rich control unit is able to return the actual air-fuel ratio from a lean air-fuel ratio to a rich air-fuel ratio. In addition, when the throttle opening degree is small and, as a result, the intake air flow rate is small, the actual purge flow rate is slightly decreased with respect to the purge flow rate before the purge flow rate upper limit guard value is set. Hence, in this case, the rate of air introduced into the intake passage 21 cannot be decreased by a large amount; however, the intake air flow rate corresponding to the throttle opening degree is small, so the lean actual air-fuel ratio returns to a rich air-fuel ratio.

In addition, in step ST67, as well as the fourth embodiment, it is desirable that, in consideration of the amount of deviation between the actual air-fuel ratio and the target air-fuel ratio of the fuel cut return rich control, the electronic control unit 1 causes the purge control unit to set the purge flow rate of which the upper limit is the purge flow rate upper limit guard value. Thus, in this case, the actual air-fuel ratio is definitely controlled to the target air-fuel ratio of the fuel cut return rich control.

In addition, as in the case of the fourth embodiment, the purge flow rate upper limit guard value may be replaced with the VSV drive duty ratio upper limit guard value. The VSV drive duty ratio upper limit guard value is set on the basis of the target purge rate and the throttle opening degree. The VSV drive duty ratio upper limit guard value is decreased as the throttle opening degree increases as a rule as in the case of the purge flow rate upper limit guard value shown in FIG. 10. However, the VSV drive duty ratio upper limit guard value may possibly increase depending on the relationship with the target purge rate. Then, when the condition associated with deterioration in emission performance is satisfied during fuel cut return rich control, the purge flow rate regulating unit 64 is controlled at the VSV drive duty ratio of which the set VSV drive duty ratio upper limit guard value is used as the upper limit. Thus, in this case, as in the case of the above described purge flow rate upper limit guard value, the purge flow rate is controlled on the basis of the target purge rate and the throttle opening degree, and the rate of air introduced into the intake passage 21 decreases. Thus, the fuel cut return rich control unit is able to return the actual air-fuel ratio from a lean air-fuel ratio to a rich air-fuel ratio.

As described above, the control apparatus for an internal combustion engine according to the fifth embodiment regulates the purge flow rate on the basis of the target purge rate and the throttle opening degree to decrease the rate of air introduced into the intake passage 21 in accordance with the purge control when the condition associated with deterioration in emission performance is satisfied during fuel cut return rich control. Therefore, even when the actual air-fuel ratio once becomes a lean air-fuel ratio, the fuel cut return rich control unit according to the fifth embodiment, as in the case of the fourth embodiment, is able to control the actual air-fuel ratio to or bring the actual air-fuel ratio close to a target air-fuel ratio (rich air-fuel ratio) again. Accordingly, the control apparatus for an internal combustion engine according to the fifth embodiment is able to facilitate consumption of air in the catalyst carrier of the exhaust emission control device 92 when returning from fuel cut and, in addition, is able to increase the catalyst carrier temperature. Thus, it is possible to quickly activate the exhaust emission control device 92 to appropriately suppress deterioration in emission performance when returning from fuel cut.

Sixth Embodiment

A control apparatus for an internal combustion engine according to a sixth embodiment of the invention will be described with reference to FIG. 12, FIGS. 13A and 13B.

In the first to fifth embodiments described above, when the condition associated with deterioration in emission performance is satisfied during fuel cut return rich control, it is determined that there is an abnormality in the value detected by the pressure sensor 65. On the other hand, in normal purge control, the VSV drive duty ratio is set on the basis of the pressure in the intake passage 21, detected by the pressure sensor 65, thus controlling the purge flow rate. Therefore, when it is determined that there is an abnormality in the value detected by the pressure sensor 65, it is undesirable because the purge flow rate is not controlled to an appropriate purge flow rate when that detected value is used.

Then, in the control apparatus for an internal combustion engine according to the sixth embodiment, the basic configuration of the control apparatus is similar to those of the first to fifth embodiments, while, when the condition associated with deterioration in emission performance is satisfied during fuel cut return rich control, normal purge control is performed on the basis of the throttle opening degree instead of the value detected by the pressure sensor 65 (pressure in the intake passage 21), which may possibly have a fault. The sixth embodiment is also applied to the internal combustion engine shown in FIG. 1 and will be illustrated.

Specifically, in normal purge control based on the pressure in the intake passage 21, as shown in FIG. 2, the VSV full flow rate ratio is decreased as the pressure in the intake passage 21 increases. Here, an increase in pressure in the intake passage 21 corresponds to an increase in intake air flow rate, and also corresponds to an increase in throttle opening degree. Thus, in normal purge control based on the throttle opening degree, as shown in FIG. 12, the VSV full flow rate ratio is decreased as the throttle opening degree increases.

Hereinafter, operations of the control apparatus for an internal combustion engine according to the sixth embodiment will be described with reference to the flowchart shown in FIGS. 13 and 13B. Note that the determination in step ST5 to ST25 is similar to the determination in step ST5 to ST25 described in the third to fifth embodiments, so the description thereof is omitted. In addition, operations when negative determination is made in step ST5 are also similar to those described in the third to fifth embodiments, so the description thereof is omitted.

When it is determined in step ST25 that the lean air-fuel ratio duration is longer than or equal to the predetermined period of time, the electronic control unit 1 according to the sixth embodiment causes the purge control unit to perform the normal purge control based on the throttle opening degree (step ST54).

Figure 12:
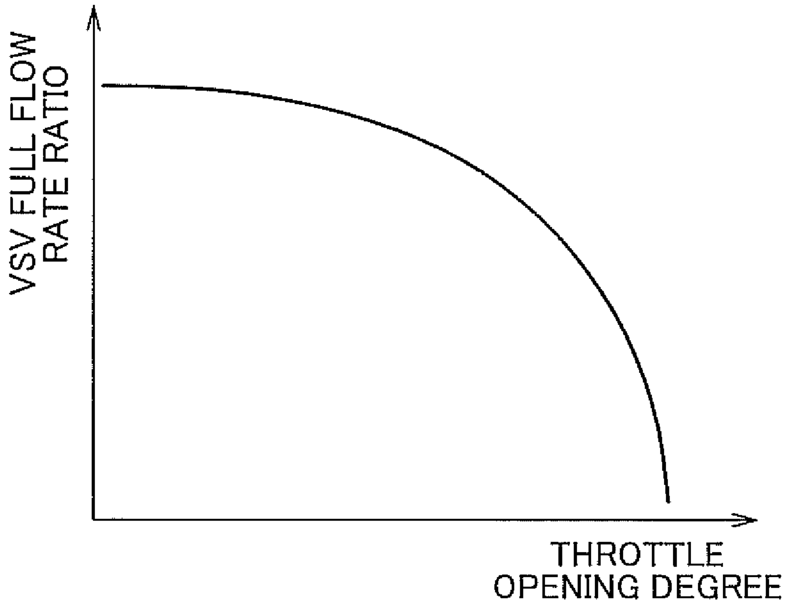
FIG. 12 is a graph that shows map data of a VSV full flow rate ratio versus a throttle opening degree.
Figure 13A:
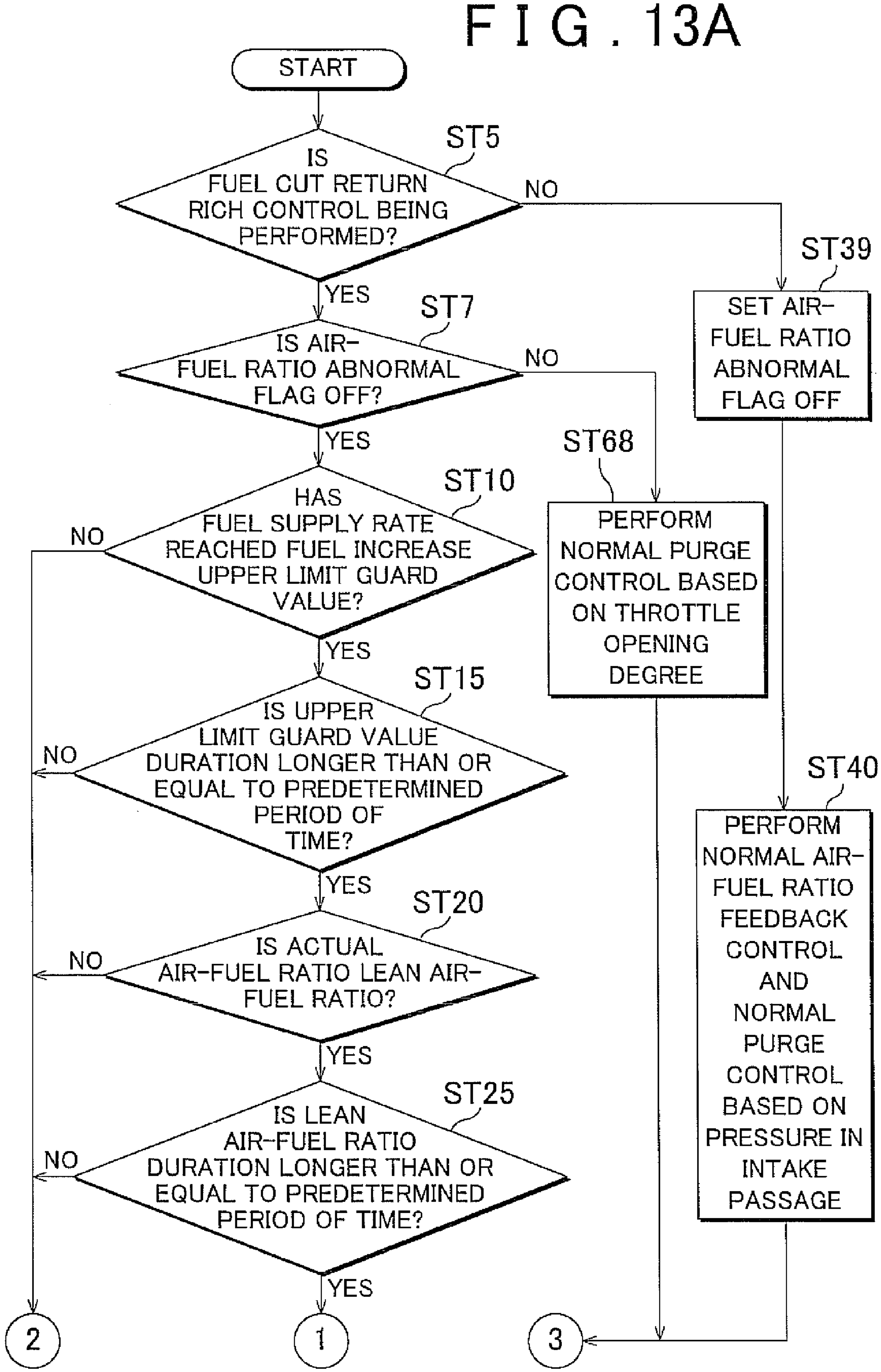
FIGS. 13A and 13B are a flowchart that illustrates operations of a control apparatus for an internal combustion engine according to a sixth embodiment.
Figure 13B:
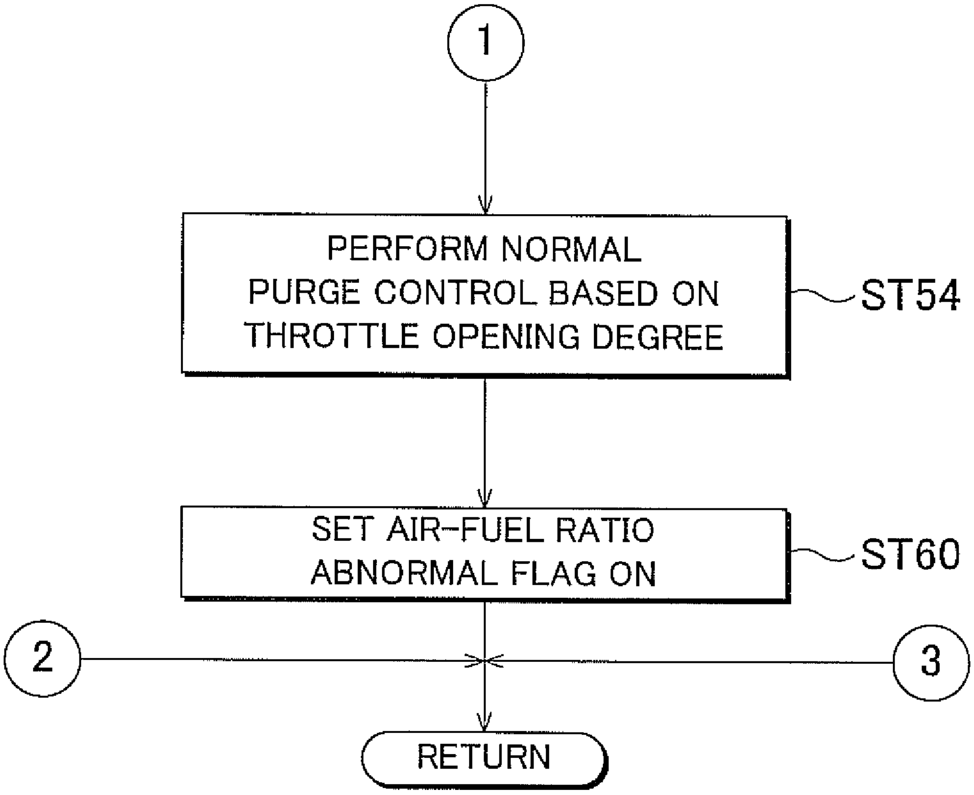

In step ST54, the purge control unit reads the VSV full flow rate ratio based on the value detected by the throttle opening degree sensor 26 from the map data shown in FIG. 12. Then, the purge control unit substitutes the VSV full flow rate ratio into the above described equation (2), calculates the VSV drive duty ratio on the basis of the equation (1), and then controls the purge flow rate regulating unit 64 so as to attain the VSV drive duty ratio.

The electronic control unit 1 subsequently sets the air-fuel ratio abnormal flag (air-fuel ratio abnormal flag is on) (step ST60) and then returns to step ST5. After the electronic control unit 1 returns to step ST5, the electronic control unit 1 determines that the air-fuel ratio abnormal flag is set in step ST7 (air-fuel ratio abnormal flag is on) during fuel cut return rich control, and causes the purge control unit to perform the normal purge control based on the throttle opening degree as in the case of the above step ST54 (step ST68).

By so doing, here, when the value detected by the pressure sensor 65 seems to have an abnormality and then information of the intake air flow rate that can be estimated from that detected value is not reliable, the purge flow rate is controlled on the basis of the value detected by the throttle opening degree sensor 26. Information of an accurate intake air flow rate can be estimated from the value detected by the throttle opening degree sensor 26. That is, the control apparatus for an internal combustion engine according to the sixth embodiment performs the normal purge control on the basis of the magnitude of the throttle opening degree from which information of an accurate intake air flow rate can be estimated when the condition associated with deterioration in emission performance is satisfied during fuel cut return rich control. Therefore, the purge control is performed at the purge flow rate that is adapted to an actual intake air flow rate. Thus, the fuel cut return rich control unit according to the sixth embodiment is able to control the actual air-fuel ratio to a target air-fuel ratio (rich air-fuel ratio) even when the actual air-fuel ratio once becomes a lean air-fuel ratio. Accordingly, the control apparatus for an internal combustion engine according to the sixth embodiment is able to facilitate consumption of air in the catalyst carrier of the exhaust emission control device 92 when returning from fuel cut and, in addition, is able to increase the catalyst carrier temperature. Thus, it is possible to quickly activate the exhaust emission control device 92 to appropriately suppress deterioration in emission performance when returning from fuel cut.

As described above, the control apparatus for an internal combustion engine according to the aspects of the invention is useful as a technique that is able to suppress deterioration in emission performance when returning from fuel cut.

What is claimed is:

1. A control apparatus for an internal combustion engine, comprising:

a purge control unit that performs purge control to cause fuel evaporative emission to be introduced into an intake passage so as to attain a purge flow rate based on a pressure in the intake passage, to which the fuel evaporative emission is supplied;

a fuel cut return control unit that performs a fuel cut return rich control or a fuel cut return normal control different than the fuel cut return rich control, the fuel cut return rich control sets a target air-fuel ratio to a rich air-fuel ratio when returning from fuel cut and controls an injector fuel supply rate in a feedback manner on the basis of the target air-fuel ratio, the purge flow rate and an intake air flow rate so as to attain the target air-fuel ratio;

a fuel increase upper limit setting unit that sets an allowable rich upper limit for an increase in injector fuel supply rate in the fuel cut return rich control and an allowable normal upper limit for an increase in the injector fuel supply rate in the fuel cut return normal control, the allowable normal upper limit is greater than the allowable rich upper limit; and an actual air-fuel ratio control unit that in a first operating mode controls the fuel cut return control unit to prohibit the fuel cut return rich control when an actual air-fuel ratio, obtained during the fuel cut return rich control, is a lean air-fuel ratio and the injector fuel supply rate in the fuel cut return rich control has reached the allowable rich upper limit, the actual air-fuel ratio control unit controls the purge control unit to perform purge control and the actual air-fuel ratio control unit controls the fuel cut return control unit to perform the fuel cut return normal control to allow the injector fuel supply rate to increase above the allowable rich upper limit to control the actual air-fuel ratio to a richer air-fuel ratio.

2. The control apparatus according to claim 1, wherein the actual air-fuel ratio control unit includes the fuel cut return control unit, the purge control unit, and the fuel increase upper limit setting unit.

3. The control apparatus according to claim 2, wherein the actual air-fuel ratio control unit controls the fuel increase upper limit setting unit to increase the allowable upper limit.

4. The control apparatus according to claim 1, wherein the actual air-fuel ratio control unit in a second operating mode controls the fuel cut return control unit to prohibit the fuel cut return rich control when an actual air-fuel ratio, obtained during the fuel cut return rich control, is a lean air-fuel ratio and the injector fuel supply rate in the fuel cut return rich control has reached the allowable rich upper limit, the actual air-fuel ratio control unit controls the purge control unit to prohibit purge control and the actual air-fuel ratio control unit controls the fuel cut return control unit to perform the fuel cut return normal control to allow the injector fuel supply rate to increase above the allowable rich upper limit to control the actual air-fuel ratio to a richer air-fuel ratio.

5. The control apparatus according to claim 2, wherein the actual air-fuel ratio control unit controls the purge control unit to decrease the purge flow rate as an actual air-fuel ratio becomes leaner or as a throttle opening degree increases.

6. The control apparatus according to claim 2, wherein the actual air-fuel ratio control unit controls the purge control unit to perform the purge control based on a throttle opening degree instead of the pressure in the intake passage.

7. A control method for an internal combustion engine, comprising:

performing purge control to cause fuel evaporative emission to be introduced into an intake passage so as to attain a purge flow rate based on a pressure in the intake passage, to which the fuel evaporative emission is supplied;

performing fuel cut return rich control to set a target air-fuel ratio to a rich air-fuel ratio when returning from fuel cut and to control a injector fuel supply rate in a feedback manner on the basis of the target air-fuel ratio, the purge flow rate and an intake air flow rate so as to attain the target air-fuel ratio;

setting an allowable rich upper limit for an increase in injector fuel supply rate in the fuel cut return rich control, and setting an allowable normal upper limit for an increase in the injector fuel supply rate in a fuel cut return normal control that is different than the fuel cut return rich control, the allowable normal upper limit is greater than the allowable rich upper limit;

prohibiting the fuel cut return rich control when an actual air-fuel ration, obtained during the fuel cut return rich control, is a lean air-fuel ratio and the injector fuel supply rate in the fuel cut return rich control has reached the allowable rich upper limit; and controlling the actual air-fuel ratio to a richer air-fuel ratio by performing the fuel cut return normal control to allow the injector fuel supply rate to increase above the allowable rich upper limit while performing purge control.

* * * * *